US012454132B2

(12) United States Patent
Koase

(10) Patent No.: US 12,454,132 B2
(45) Date of Patent: Oct. 28, 2025

(54) LIQUID EJECTION APPARATUS AND CONTROL METHOD OF LIQUID EJECTION APPARATUS

(71) Applicant: SEIKO EPSON CORPORATION, Tokyo (JP)

(72) Inventor: Takashi Koase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 18/537,507

(22) Filed: Dec. 12, 2023

(65) Prior Publication Data

US 2024/0190134 A1 Jun. 13, 2024

(30) Foreign Application Priority Data

Dec. 13, 2022 (JP) ................................ 2022-198664

(51) Int. Cl.
*B41J 2/175* (2006.01)

(52) U.S. Cl.
CPC ................................ *B41J 2/17523* (2013.01)

(58) Field of Classification Search
CPC ........ B41J 2/165; B41J 2/175; B41J 2/17509; B41J 2/17513; B41J 2/17523; B41J 2/17596; B41J 2/19
See application file for complete search history.

(56) References Cited

U.S. PATENT DOCUMENTS

| | | | | |
|---|---|---|---|---|
| 10,207,514 | B2 * | 2/2019 | Kamei | B41J 2/175 |
| 2005/0195246 | A1 | 9/2005 | Ogawa | |
| 2009/0262150 | A1 * | 10/2009 | Morita | B41J 2/175 347/17 |
| 2015/0191022 | A1 * | 7/2015 | Matsumoto | B41J 2/17596 347/85 |
| 2015/0224786 | A1 * | 8/2015 | Otsuka | B41J 2/175 347/92 |
| 2021/0206170 | A1 * | 7/2021 | Kobayashi | B41J 2/16538 |
| 2022/0203694 | A1 | 6/2022 | Koase | |

FOREIGN PATENT DOCUMENTS

| | | |
|---|---|---|
| JP | 2010-179661 A | 8/2010 |
| JP | 2022-101000 A | 7/2022 |

* cited by examiner

*Primary Examiner* — Anh T Vo
(74) *Attorney, Agent, or Firm* — WORKMAN NYDEGGER

(57) ABSTRACT

A liquid ejection apparatus includes a liquid ejection head, a liquid storage portion having a first storage chamber and a second storage chamber, a first discharge flow path communicating with an upper portion of the first storage chamber, a second discharge flow path communicating with an upper portion of the second storage chamber, a carriage, a coupling portion configured to be coupled to and separated from a coupled portion, a negative pressure generating section, a first opening/closing portion, a second opening/closing portion, a switching member configured to switch between a first state and a second state, the first opening/closing portion can be opened and closed in conjunction with a movement of the carriage when the switching member is in the first state, and the second opening/closing portion can be opened and closed in conjunction with the movement of the carriage when the switching member is in the second state.

10 Claims, 16 Drawing Sheets

LIQUID EJECTION APPARATUS AND CONTROL METHOD OF LIQUID EJECTION APPARATUS

The present application is based on, and claims priority from JP Application Serial Number 2022-198664, filed Dec. 13, 2022, the disclosure of which is hereby incorporated by reference herein in its entirety.

BACKGROUND

1. Technical Field

The present disclosure relates to a liquid ejection apparatus such as a printer and a control method of the liquid ejection apparatus.

2. Related Art

For example, JP-A-2010-179661 discloses a printer that is an example of a liquid ejection apparatus that ejects ink, which is an example of a liquid, from a recording head, which is an example of a liquid ejection head, to perform recording. The printer includes an air bubble storage chamber, a discharge path, and a pump which is an example of a negative pressure generating section. The air bubble storage chamber is provided in a flow path that supplies the liquid to the recording head. The air bubble storage chamber stores air bubbles contained in the ink. The discharge path extends from a ceiling wall of the air bubble storage chamber. The pump discharges the air bubbles stored in the air bubble storage chamber by sucking the air bubble storage chamber through the discharge path.

When a plurality of storage chambers are provided in a flow path for supplying a liquid, an amount of air bubbles may be uneven in the plurality of storage chambers. In this case, when a plurality of storage chambers are sucked, there is a concern that air bubbles are discharged from one storage chamber and a liquid is discharged from other storage chambers. Therefore, there is a concern that the liquid is wastefully consumed from the storage chamber.

SUMMARY

According to an aspect of the present disclosure, there is provided a liquid ejection apparatus including: a liquid ejection head ejecting a liquid from a nozzle; a liquid storage portion having a first storage chamber and a second storage chamber and configured to store the liquid supplied from a liquid supply source to the liquid ejection head; a first discharge flow path communicating with an upper portion of the first storage chamber; a second discharge flow path communicating with an upper portion of the second storage chamber; a carriage on which the liquid ejection head, the liquid storage portion, the first discharge flow path, and the second discharge flow path are mounted and which is configured to reciprocate in a scanning direction; a coupling portion configured to be coupled to and separated from a coupled portion that communicates with the first discharge flow path and the second discharge flow path; a negative pressure generating section applying a negative pressure to the first discharge flow path and the second discharge flow path via the coupling portion; a first opening/closing portion configured to open and close the first discharge flow path; a second opening/closing portion configured to open and close the second discharge flow path; and a switching member configured to switch between a first state and a second state, in which the first opening/closing portion is configured to be opened and closed in conjunction with a movement of the carriage when the switching member is in the first state, and the second opening/closing portion is configured to be opened and closed in conjunction with the movement of the carriage when the switching member is in the second state.

According to another aspect of the present disclosure, there is provided a control method of a liquid ejection apparatus that includes a liquid ejection head ejecting a liquid from a nozzle, a liquid storage portion having a first storage chamber and a second storage chamber and configured to store the liquid supplied from a liquid supply source to the liquid ejection head, a first discharge flow path communicating with an upper portion of the first storage chamber, a second discharge flow path communicating with the upper portion of the second storage chamber, a carriage on which the liquid ejection head, the liquid storage portion, the first discharge flow path, and the second discharge flow path are mounted and which is configured to reciprocate in a scanning direction, a coupling portion configured to be coupled to and separated from a coupled portion that communicates with the first discharge flow path and the second discharge flow path, a negative pressure generating section applying a negative pressure to the first discharge flow path and the second discharge flow path via the coupling portion, a first opening/closing portion configured to open and close the first discharge flow path, a second opening/closing portion configured to open and close the second discharge flow path, and a switching member configured to switch between a first state and a second state, the control method including: opening the first opening/closing portion by setting the switching member to the first state and moving the carriage, and discharging air bubbles from the first storage chamber; and opening the second opening/closing portion by setting the switching member to the second state and moving the carriage, and discharging air bubbles from the second storage chamber.

DESCRIPTION OF EMBODIMENTS

One Embodiment

Figure 1:
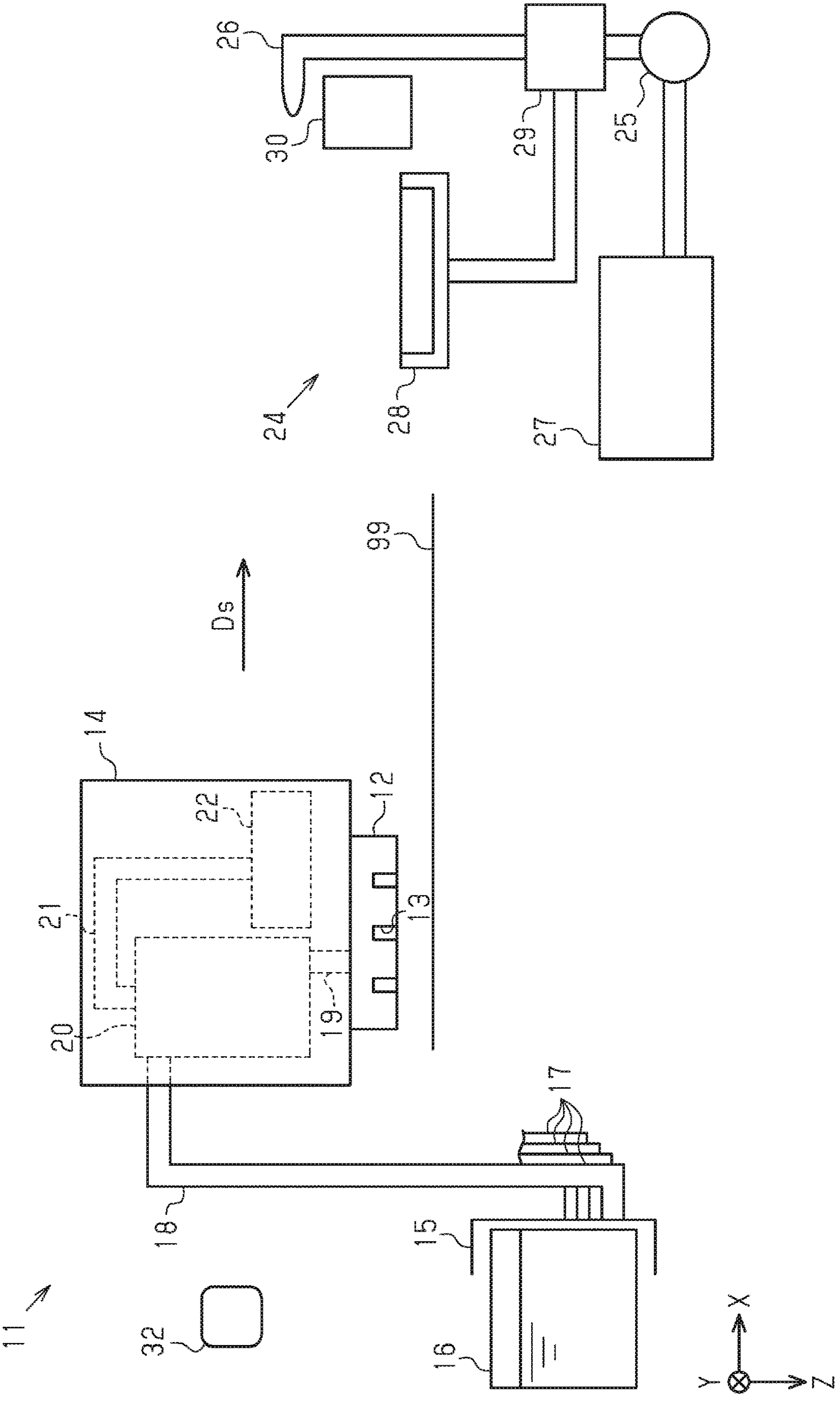
FIG. 1 is a schematic view illustrating an example of a liquid ejection apparatus.

An embodiment of a liquid ejection apparatus and a control method of the liquid ejection apparatus will be described below with reference to the drawings. The liquid ejection apparatus is an ink jet type printer that prints images such as characters and photographs by ejecting ink, which is an example of a liquid, onto a medium such as paper or cloth.

In the drawing, a direction of gravity is illustrated by a Z axis, and a direction along a horizontal plane is illustrated by an X axis and a Y axis, assuming that a liquid ejection apparatus 11 is placed on a horizontal plane. The X axis, the Y axis, and the Z axis are orthogonal to each other. In the present embodiment, rotation of less than 360 degrees around an axis is also referred to as rotation.

Overall Configuration of Liquid Ejection Apparatus

As illustrated in FIG. 1, the liquid ejection apparatus 11 includes the liquid ejection head 12. A liquid ejection head 12 has a nozzle 13. The liquid ejection head 12 is configured to eject a liquid from the nozzle 13. The liquid ejection head 12 prints an image on a medium 99 by ejecting a liquid from the nozzle 13 onto the medium 99.

The liquid ejection apparatus 11 includes a carriage 14. The liquid ejection head 12 is mounted on the carriage 14. The carriage 14 is configured to scan against the medium 99. In other words, the carriage 14 can reciprocate in a scanning direction Ds. That is, the liquid ejection apparatus 11 of the present example is a serial type printer in which the carriage 14 moves in the scanning direction Ds and the direction opposite to the scanning direction Ds to perform printing.

The liquid ejection apparatus 11 may include a mounting portion 15. The mounting portion 15 may be configured such that a plurality of liquid supply sources 16 are mounted. For example, four liquid supply sources 16 can be mounted on the mounting portion 15. The liquid supply source 16 is, for example, an ink tank, an ink cartridge, or the like. For example, the four liquid supply sources 16 accommodate different liquids. For example, the four liquid supply sources 16 accommodate cyan ink, magenta ink, yellow ink, and black ink. In the drawings, only one liquid supply source 16 is illustrated.

The liquid ejection apparatus 11 may include a plurality of supply flow paths 17. The liquid ejection apparatus 11 includes, for example, four supply flow paths 17. The plurality of supply flow paths 17 are flow paths for supplying the liquid from the plurality of liquid supply sources 16 to the liquid ejection head 12. The liquid ejection head 12 ejects liquid supplied from a plurality of liquid supply sources 16 from the nozzle 13.

The plurality of supply flow paths 17 are coupled to the plurality of liquid supply sources 16 and the liquid ejection head 12. The plurality of supply flow paths 17 are respectively coupled to the plurality of liquid supply sources 16. The plurality of supply flow paths 17 are coupled to the liquid ejection head 12. That is, one supply flow path 17 is coupled to one liquid supply source 16 and the liquid ejection head 12. The supply flow path 17 extends from the mounting portion 15. The supply flow path 17 is coupled to the liquid supply source 16 by mounting the liquid supply source 16 on the mounting portion 15.

The supply flow path 17 includes, for example, a first supply flow path 18 and a second supply flow path 19. The first supply flow path 18 is coupled to the liquid supply source 16. The second supply flow path 19 is coupled to the liquid ejection head 12. In the supply flow path 17, the liquid flows in the order of the first supply flow path 18 and the second supply flow path 19. The first supply flow path 18 extends inside and outside the carriage 14. The second supply flow path 19 extends inside the carriage 14.

The liquid ejection apparatus 11 includes a liquid storage portion 20. The liquid ejection apparatus 11 may include a plurality of liquid storage portions 20. The liquid ejection apparatus 11 includes, for example, four liquid storage portions 20. In the drawing, only one liquid storage portion 20 is illustrated. The plurality of liquid storage portions 20 are positioned in each of the plurality of supply flow paths 17. That is, one liquid storage portion 20 is positioned in one supply flow path 17. The liquid storage portion 20 is positioned, for example, between the first supply flow path 18 and the second supply flow path 19. The liquid storage portion 20 is mounted on the carriage 14. The liquid storage portion 20 can store the liquid supplied from the liquid supply source 16 to the liquid ejection head 12. A configuration of the liquid storage portion 20 will be described later.

The liquid ejection apparatus 11 includes a discharge flow path 21. The liquid ejection apparatus 11 may include a plurality of discharge flow paths 21. The liquid ejection apparatus 11 includes, for example, four discharge flow paths 21. In the drawings, only one discharge flow path 21 is illustrated. The plurality of discharge flow paths 21 extend from the plurality of liquid storage portions 20, respectively. That is, one discharge flow path 21 extends from one liquid storage portion 20. The plurality of discharge flow paths 21 are mounted on the carriage 14.

The discharge flow path 21 is a flow path for discharging air bubbles in the liquid storage portion 20. A liquid supplied from the liquid supply source 16 to the liquid storage portion 20 may contain air bubbles. Therefore, air bubbles are likely to accumulate in the upper portion of the liquid storage portion 20. The discharge flow path 21 is coupled to, for example, the upper portion of the liquid storage portion 20. A configuration of the discharge flow path 21 will be described later.

The liquid ejection apparatus 11 may include a coupled portion 22. The coupled portion 22 is coupled to the plurality of discharge flow paths 21. The coupled portion 22 merges the plurality of discharge flow paths 21 by being coupled to the plurality of discharge flow paths 21. The coupled portion 22 is mounted, for example, on the carriage 14. A configuration of the coupled portion 22 will be described later.

The liquid ejection apparatus 11 includes a maintenance unit 24. The maintenance unit 24 is a unit for maintaining the liquid ejection apparatus 11.

The maintenance unit 24 has a negative pressure generating section 25. The negative pressure generating section 25 is, for example, a pump. Specifically, the negative pressure generating section 25 is a tube pump. The negative pressure generating section 25 is coupled to, for example, the plurality of discharge flow paths 21. In the present example, the negative pressure generating section 25 is coupled to the plurality of discharge flow paths 21 by being coupled to the coupled portion 22. The negative pressure generating section 25 may be, for example, directly coupled to the plurality of discharge flow paths 21. In the present example, the negative pressure generating section 25 is coupled to the plurality of discharge flow paths 21 by moving the carriage 14 to a predetermined position. The predetermined position will be described later. The negative pressure generating section 25 is coupled to the plurality of discharge flow paths 21, for example, by positioning the carriage 14 at a home position. The home position is, for example, a position where the carriage 14 stands by when the liquid ejection head 12 does not eject the liquid to the medium 99. The negative pressure generating section 25 applies a negative pressure to the plurality of discharge flow paths 21 by sucking. As a result, the negative pressure generating section 25 sucks air bubbles accumulated in the liquid storage portion 20. As a result, the air bubbles are discharged from the liquid storage portion 20.

The maintenance unit 24 has a coupling portion 26. The coupling portion 26 is coupled to the negative pressure generating section 25. The coupling portion 26 can be coupled to, for example, the coupled portion 22. Since the coupling portion 26 is coupled to the coupled portion 22, the negative pressure generating section 25 is coupled to the plurality of discharge flow paths 21. The negative pressure generating section 25, for example, applies a negative pressure to the plurality of discharge flow paths 21 via the coupling portion 26. The coupling portion 26 may be directly coupled to the plurality of discharge flow paths 21.

The coupling portion 26 is coupled to the coupled portion 22 by, for example, moving the carriage 14 to a predetermined position. Specifically, the coupling portion 26 is coupled to the coupled portion 22 in a process of moving the carriage 14 to a predetermined position. When the carriage 14 is positioned at the home position, the coupling portion 26 is inserted into the coupled portion 22. At this time, the coupling portion 26 is coupled to the coupled portion 22. As the carriage 14 approaches the coupling portion 26 from the home position, the coupling portion 26 is further inserted into the coupled portion 22. The predetermined position is a position closer to the coupling portion 26 than the home position. The carriage 14 passes through the home position in the process of moving to the predetermined position. Therefore, when the carriage 14 moves to a predetermined position, the coupling portion 26 is inserted into the coupled portion 22.

The coupling portion 26 is coupled to the coupled portion 22 by inserting the coupling portion 26 into the coupled portion 22. Accordingly, it is not necessary to route the coupling portion 26 in the liquid ejection apparatus 11 to follow the carriage 14 as compared with a case where the coupling portion 26 is constantly coupled to the coupled portion 22. Therefore, the configuration of the liquid ejection apparatus 11 is simplified.

The maintenance unit 24 may have an accommodation portion 27. The accommodation portion 27 is coupled to the negative pressure generating section 25. The air bubbles and the liquid sucked by the negative pressure generating section 25 are discharged to the accommodation portion 27. The accommodation portion 27 accommodates a waste liquid generated by maintenance.

The maintenance unit 24 may have a cap 28. The cap 28 is configured to come into contact with the liquid ejection head 12. The cap 28 covers the nozzle 13 by coming into contact with the liquid ejection head 12. The contact of the cap 28 with the liquid ejection head 12 to cover the nozzle 13 is referred to as capping. A space communicating with the nozzle 13 is formed in the cap 28 due to the capping. The capping suppresses drying of the nozzle 13.

The cap 28 is configured to be displaced between a position at which the cap 28 comes into contact with the liquid ejection head 12 and a position at which the cap 28 does not come into contact with the liquid ejection head 12. The cap 28 is configured to be movable, for example, in an up-down direction. The cap 28 comes into contact with the liquid ejection head 12 by moving upward in a state of facing the liquid ejection head 12. For example, the cap 28 can come into contact with the liquid ejection head 12 when the carriage 14 is positioned at the home position.

The cap 28 may be coupled to the negative pressure generating section 25. In this case, the negative pressure generating section 25 sucks the inside of the discharge flow path 21 and the inside of the cap 28. Specifically, the negative pressure generating section 25 sucks the inside of the coupled portion 22 and the inside of the cap 28.

The negative pressure generating section 25 sucks the liquid from the cap 28 by sucking the inside of the cap 28. For example, when the negative pressure generating section 25 sucks the inside of the cap 28 in a state in which the cap 28 is capped, the negative pressure in the cap 28 acts on the nozzle 13. As a result, the thickened liquid, the solidified liquid, and the like are discharged from the nozzle 13. That is, the maintenance unit 24 cleans the liquid ejection head 12. The liquid sucked from the cap 28 is accommodated in the accommodation portion 27.

The maintenance unit 24 may have a switching section 29. The switching section 29 is positioned between the negative pressure generating section 25 and the coupling portion 26 and between the negative pressure generating section 25 and the cap 28, in the maintenance unit 24. That is, the negative pressure generating section 25 is coupled to the coupling portion 26 via the switching section 29. The negative pressure generating section 25 is coupled to the cap 28 via the switching section 29.

The switching section 29 is configured to switch a coupling destination of the negative pressure generating section 25. That is, the switching section 29 switches, for example, the coupling destination of the negative pressure generating section 25 between the coupling portion 26 and the cap 28. The switching section 29 is, for example, a switching valve. Thereby, one negative pressure generating section 25 can apply a negative pressure to both the discharge flow path 21 and the cap 28. That is, the configuration of the liquid ejection apparatus 11 is simplified. The maintenance unit 24 may have a pump coupled to the cap 28 in addition to the negative pressure generating section 25 coupled to the discharge flow path 21.

The liquid ejection apparatus 11 may include an opening portion 30. The opening portion 30 is configured to open the discharge flow path 21. For example, when the opening portion 30 opens the discharge flow path 21, air bubbles can flow from the discharge flow path 21 to the coupled portion 22.

The opening portion 30 opens the discharge flow path 21 when, for example, the carriage 14 is positioned at a predetermined position. Specifically, the opening portion 30 opens the discharge flow path 21 when the carriage 14 moves from the home position to a predetermined position. When the discharge flow path 21 is opened, air bubbles can flow from the discharge flow path 21 to the coupled portion 22. In the present example, when the carriage 14 is not positioned at the predetermined position, the discharge flow path 21 is closed. Therefore, the possibility that the liquid leaks from the discharge flow path 21 during printing or when waiting for printing is reduced. The configuration of the opening portion 30 will be described later.

The liquid ejection apparatus 11 includes a control section 32. The control section 32 controls the liquid ejection apparatus 11. The control section 32 controls, for example, the liquid ejection head 12, the carriage 14, the maintenance unit 24, and the like. The control section 32 controls the negative pressure generating section 25. The control section 32 controls, for example, a rotation speed of the negative pressure generating section 25 to control a suction flow rate by the negative pressure generating section 25. The suction flow rate is, for example, a volume of fluid sucked per unit time. As the suction flow rate increases, the negative pressure acting by the negative pressure generating section 25 increases.

The control section 32 may be one or more processors that execute various processes according to a computer program. The control section 32 may be one or more dedicated hardware circuits such as application-specific integrated circuits that execute at least some of various processes. The control section 32 may be a circuit including a combination of the processor and the hardware circuit. The processor includes a CPU and a memory such as a RAM and a ROM. The memory stores program codes or instructions configured to cause the CPU to execute processes. The memory, that is, a computer-readable medium includes any readable media that can be accessed by a general purpose or dedicated computer.

Detailed Configuration of Liquid Ejection Apparatus

Next, configurations of the liquid storage portion 20, the discharge flow path 21, the coupled portion 22, the opening portion 30, and the coupling portion 26 will be described.

First, the liquid storage portion 20 will be described. Since the plurality of liquid storage portions 20 each have the same configuration, one liquid storage portion 20 will be described here. In the present example, the direction in which the liquid flows from the liquid supply source 16 toward the liquid ejection head 12 is also referred to as a supply direction. In the present example, the liquid supply source 16 side in the supply direction is also referred to as upstream, and the liquid ejection head 12 side is also referred to as downstream.

Figure 2:
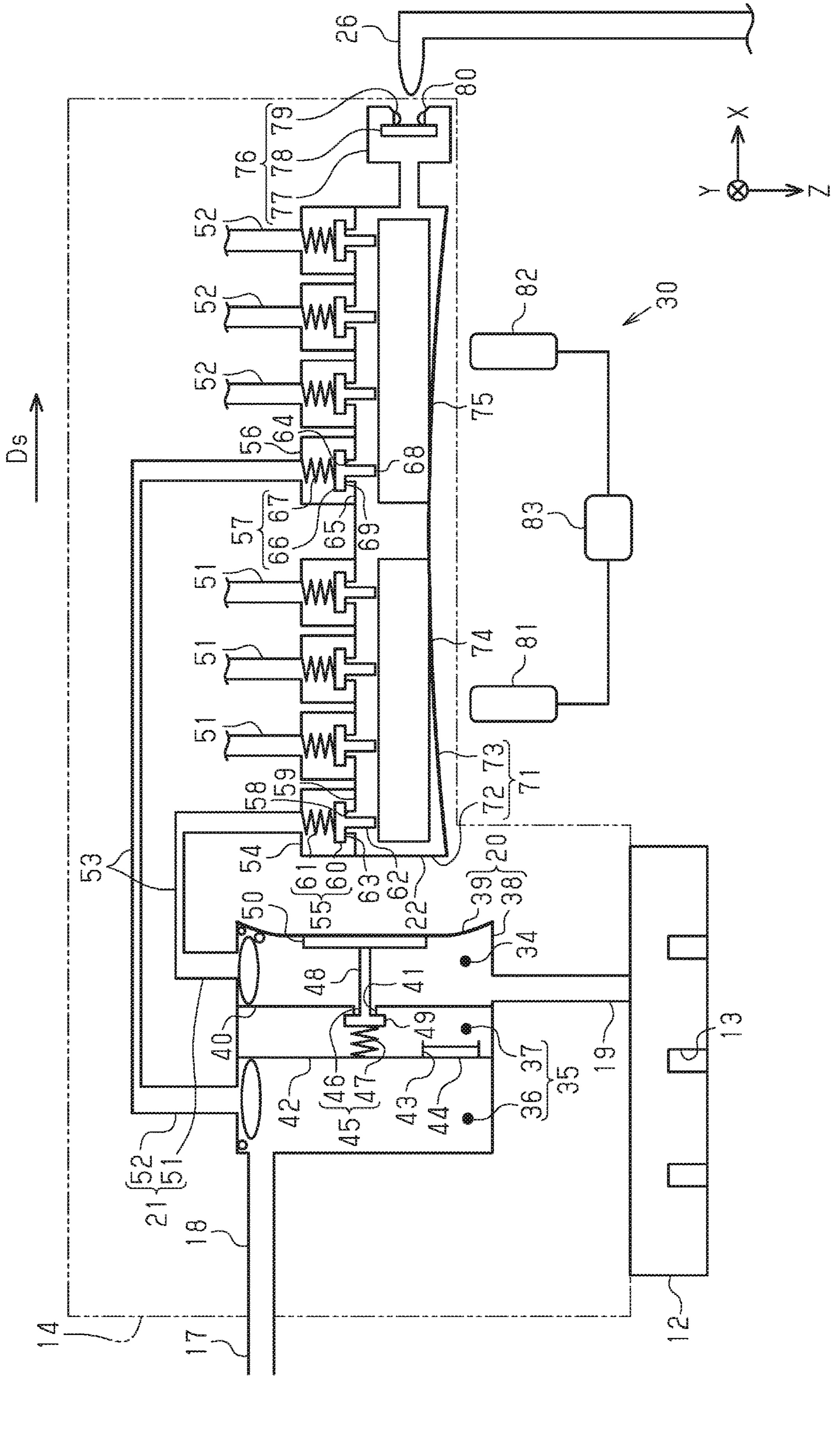
FIG. 2 is a schematic view illustrating a liquid storage portion, a discharge flow path, and an opening portion.

As illustrated in FIG. 2, the liquid storage portion 20 includes a first storage chamber 34 and a second storage chamber 35. The first storage chamber 34 of the present example is a pressure chamber disposed downstream of the second storage chamber 35. The liquid supplied from the liquid supply source 16 is stored in the second storage chamber 35 and the first storage chamber 34.

The second storage chamber 35 includes, for example, a first filter chamber 36 and a second filter chamber 37. The first filter chamber 36 is positioned upstream of the second filter chamber 37 in the supply direction. Therefore, the liquid flows from the first filter chamber 36 to the second filter chamber 37 in the second storage chamber 35.

The second storage chamber 35 is positioned upstream of the first storage chamber 34. Therefore, the liquid flows in the order of the second storage chamber 35 and the first storage chamber 34 in the liquid storage portion 20. Specifically, the liquid flows in the order of the first filter chamber 36, the second filter chamber 37, and the first storage chamber 34.

In the present example, the first supply flow path 18 communicates with the first filter chamber 36. In the present example, the second supply flow path 19 communicates with the first storage chamber 34. Therefore, in the present example, the first storage chamber 34 communicates with the first supply flow path 18 via the second storage chamber 35.

The liquid storage portion 20 includes, for example, a storage body 38 and a first flexible film 39. The storage body 38 is, for example, a resin case. The first flexible film 39 is, for example, a film having flexibility. The liquid storage portion 20 is configured to store the liquid by attaching the first flexible film 39 to the storage body 38. The storage body 38 is coupled to the first supply flow path 18 and the second supply flow path 19. The storage body 38 defines the first storage chamber 34 and the second storage chamber 35. The first flexible film 39 defines the first storage chamber 34. Therefore, a volume of the first storage chamber 34 changes due to displacement of the first flexible film 39.

The storage body 38 has, for example, a partition wall 40. The partition wall 40 is a wall that partitions the inside of the liquid storage portion 20. The partition wall 40 partitions a space inside the liquid storage portion 20 into the first storage chamber 34 and the second storage chamber 35. A through hole 41 that allows the first storage chamber 34 and the second storage chamber 35 to communicate with each other opens in the partition wall 40.

The storage body 38 has, for example, a separation wall 42. The separation wall 42 is a wall that divides the second storage chamber 35 into the first filter chamber 36 and the second filter chamber 37. A mounting hole 43 through which the first filter chamber 36 and the second filter chamber 37 communicate with each other is opened in the separation wall 42.

The liquid storage portion 20 includes, for example, a filter 44. The filter 44 is positioned in the second storage chamber 35. The second storage chamber 35 of the present embodiment is a filter chamber in which the filter 44 is disposed. The filter 44 is attached to the storage body 38. The filter 44 is attached to the separation wall 42. The filter 44 is fitted into, for example, the mounting hole 43. The liquid passes through the filter 44, and thus, flows from the first filter chamber 36 to the second filter chamber 37. The liquid passes through the filter 44, and thus, foreign substances are removed from the liquid.

The liquid storage portion 20 may have an adjustment valve 45. The adjustment valve 45 opens and closes the supply flow path 17. By opening the adjustment valve 45, the liquid flows from the first supply flow path 18 to the second supply flow path 19 through the liquid storage portion 20.

The adjustment valve 45 is a valve that adjusts the pressure inside the liquid ejection head 12. The adjustment valve 45 adjusts the pressure in the liquid ejection head 12 by adjusting the pressure of the first storage chamber 34. The adjustment valve 45 opens the supply flow path 17 when the pressure inside the liquid ejection head 12 becomes equal to or lower than a predetermined pressure. The adjustment valve 45 adjusts the pressure of the first storage chamber 34 so that the pressure inside the liquid ejection head 12 becomes a predetermined negative pressure. The adjustment valve 45 has, for example, an adjustment valve body 46 and an adjustment spring 47.

The adjustment valve body 46 has, for example, a shaft part 48 and a plate part 49. The shaft part 48 is inserted into the through hole 41. The plate part 49 is positioned at one end of the shaft part 48. The plate part 49 is positioned in the second filter chamber 37. The other end of the shaft part 48 is positioned in the first storage chamber 34. Therefore, the adjustment valve body 46 is positioned across the first storage chamber 34 and the second filter chamber 37. The other end of the shaft part 48 contacts the first flexible film 39. A contact plate 50 that comes into contact with the other end of the shaft part 48 may be attached to the first flexible film 39.

The adjustment spring 47 is positioned in the second filter chamber 37. The adjustment spring 47 comes into contact with, for example, the separation wall 42 and the plate part 49. The adjustment spring 47 presses the plate part 49 toward the partition wall 40. The plate part 49 closes the through hole 41 by coming into contact with the partition wall 40.

When the pressure in the first storage chamber 34 decreases, the first flexible film 39 is displaced to approach the partition wall 40. For example, when the pressure of the first storage chamber 34 decreases due to the liquid ejection head 12 ejecting the liquid, the first flexible film 39 is displaced so that the volume of the first storage chamber 34 decreases. As a result, the first flexible film 39 presses the adjustment valve body 46 toward the adjustment spring 47.

When a force that the first flexible film 39 presses the adjustment valve body 46 exceeds a force that the adjustment spring 47 presses the adjustment valve body 46, the plate part 49 is separated from the partition wall 40. When the plate part 49 is separated from the partition wall 40, the through hole 41 is opened. As a result, the liquid flows from the second filter chamber 37 to the first storage chamber 34. When the liquid flows into the first storage chamber 34, the pressure in the first storage chamber 34 increases. When the pressure in the first storage chamber 34 increases, the first flexible film 39 is displaced to be separated from the partition wall 40. As a result, the plate part 49 comes into contact with the partition wall 40. In this way, the adjustment valve 45 adjusts the pressure of the first storage chamber 34 to a predetermined negative pressure.

Next, the discharge flow path 21 will be described. Since each of the plurality of discharge flow paths 21 has the same configuration, one discharge flow path 21 will be described here.

The discharge flow path 21 includes, for example, a first discharge flow path 51 and a second discharge flow path 52. The first discharge flow path 51 and the second discharge flow path 52 are coupled to the storage body 38. The first discharge flow path 51 is a flow path communicating with the first storage chamber 34. The first discharge flow path 51 communicates with, for example, the upper portion of the first storage chamber 34. The second discharge flow path 52 is a flow path communicating with the second storage chamber 35. Specifically, the second discharge flow path 52 communicates with the first filter chamber 36. The second discharge flow path 52 communicates with, for example, the upper portion of the first filter chamber 36.

The first discharge flow path 51 is a flow path for discharging air bubbles from the first storage chamber 34. The second discharge flow path 52 is a flow path for discharging air bubbles from the second storage chamber 35. Specifically, the second discharge flow path 52 is a flow path for discharging air bubbles accumulated in the first filter chamber 36.

Each of the first discharge flow path 51 and the second discharge flow path 52 may have a resistance portion 53. That is, one discharge flow path 21 has two resistance portions 53. In the first discharge flow path 51 and the second discharge flow path 52, the resistance portion 53 is a portion configured so that the flow path resistance increases when the liquid flows. The resistance portion 53 is a portion where a pressure loss increases when the liquid flows.

The resistance portion 53 is a portion configured so that the pressure loss is greater than that of the supply flow path 17 in the discharge flow path 21. Specifically, the resistance portion 53 is a portion of the discharge flow path 21 configured such that the pressure loss is greater than that of the first supply flow path 18. As a result, in one liquid storage portion 20, the pressure loss is greater when the liquid flows through the discharge flow path 21 coupled to the liquid storage portion 20 than when the liquid flows through the supply flow path 17 coupled to the liquid storage portion 20. Therefore, in one liquid storage portion 20, the liquid is less likely to flow through the discharge flow path 21 than the supply flow path 17.

The resistance portion 53 is constituted, for example, by a portion of the discharge flow path 21 in which a flow path cross-sectional area is small. That is, the resistance portion 53 is configured by narrowing the discharge flow path 21. Therefore, a flow path diameter of the resistance portion 53 is smaller than a flow path diameter of the supply flow path 17. The resistance portion 53 may be configured by, for example, a bent portion in the discharge flow path 21. The resistance portion 53 may be configured, for example, by increasing the flow path length of the discharge flow path 21. The discharge flow path 21 may be configured so that the liquid is less likely to flow than the supply flow path 17.

The discharge flow path 21 has a plurality of accommodation bodies and a plurality of opening/closing valves. Specifically, one discharge flow path 21 has two accommodation bodies. One discharge flow path 21 has two opening/closing valves. The first discharge flow path 51 has a first accommodation body 54 and a first opening/closing portion 55. The second discharge flow path 52 has a second accommodation body 56 and a second opening/closing portion 57. The first accommodation body 54 and the second accommodation body 56 have the same configuration. The first opening/closing portion 55 and the second opening/closing portion 57 have the same configuration.

The first accommodation body 54 is positioned in the first discharge flow path 51. The first accommodation body 54 accommodates the first opening/closing portion 55. The first accommodation body 54 constitutes an end portion of the first discharge flow path 51. The first accommodation body 54 is coupled to the coupled portion 22. The first accommodation body 54 has a first opening plate 59 through which the first coupling port 58 is open. The inside of the first accommodation body 54 and the inside of the coupled portion 22 communicate with each other through the first coupling port 58. That is, the inside of the first discharge flow path 51 and the inside of the coupled portion 22 communicate with each other by the first coupling port 58.

The first opening/closing portion 55 is an opening/closing valve of the first discharge flow path 51. The first opening/closing portion 55 can open and close the first discharge flow path 51. The first opening/closing portion 55 normally closes the first discharge flow path 51. Therefore, the first discharge flow path 51 is normally closed with respect to the coupled portion 22. The first opening/closing portion 55 includes a first opening/closing valve body 60 and a first opening/closing spring 61. The first opening/closing valve body 60 and the first opening/closing spring 61 are accommodated in the first accommodation body 54. The first opening/closing portion 55 is opened by the opening portion 30.

The first opening/closing valve body 60 has, for example, a first shaft part 62 and a first plate part 63. The first shaft part 62 is inserted into the first coupling port 58. The first plate part 63 is positioned at one end of the first shaft part 62. The first plate part 63 is positioned in the first accommodation body 54. The other end of the first shaft part 62 is positioned inside the coupled portion 22. Therefore, the first opening/closing valve body 60 is positioned across the first accommodation body 54 and the coupled portion 22.

The first opening/closing spring 61 is positioned inside the first accommodation body 54. The first opening/closing spring 61 comes into contact with the first plate part 63. The first opening/closing spring 61 presses the first opening/closing valve body 60 toward the coupled portion 22. The first opening/closing spring 61 presses the first plate part 63 toward the first opening plate 59. The first plate part 63 closes the first coupling port 58 by coming into contact with the first opening plate 59. As a result, the first discharge flow path 51 is closed.

The second accommodation body 56 is positioned in the second discharge flow path 52. The second accommodation body 56 accommodates the second opening/closing portion 57. The second accommodation body 56 constitutes the end portion of the second discharge flow path 52. The second accommodation body 56 is coupled to the coupled portion 22. The second accommodation body 56 has a second opening plate 65 through which the second coupling port 64 is open. The inside of the second accommodation body 56 and the inside of the coupled portion 22 communicate with each other through the second coupling port 64. That is, the inside of the second discharge flow path 52 and the inside of the coupled portion 22 communicate with each other by the second coupling port 64.

The second opening/closing portion 57 is an opening/closing valve of the second discharge flow path 52. The second opening/closing portion 57 can open and close the second discharge flow path 52. The second opening/closing portion 57 normally closes the second discharge flow path 52. Therefore, the second discharge flow path 52 is normally closed with respect to the coupled portion 22. The second opening/closing portion 57 includes a second opening/closing valve body 66 and a second opening/closing spring 67. The second opening/closing valve body 66 and the second opening/closing spring 67 are accommodated in the second accommodation body 56. The second opening/closing portion 57 is opened by the opening portion 30.

The second opening/closing valve body 66 has, for example, a second shaft part 68 and a second plate part 69. The second shaft part 68 is inserted into the second coupling port 64. The second plate part 69 is positioned at one end of the second shaft part 68. The second plate part 69 is positioned in the second accommodation body 56. The other end of the second shaft part 68 is positioned inside the coupled portion 22. Therefore, the second opening/closing valve body 66 is positioned across the second accommodation body 56 and the coupled portion 22.

The second opening/closing spring 67 is positioned inside the second accommodation body 56. The second opening/closing spring 67 contacts the second plate part 69. The second opening/closing spring 67 presses the second opening/closing valve body 66 toward the coupled portion 22. The second opening/closing spring 67 presses the second plate part 69 toward the second opening plate 65. The second plate part 69 closes the second coupling port 64 by coming into contact with the second opening plate 65. As a result, the second discharge flow path 52 is closed.

Next, the coupled portion 22 will be described.

The coupled portion 22 is coupled to the first discharge flow path 51 and the second discharge flow path 52. The coupled portion 22 may include a merging portion 71. A plurality of accommodation bodies are coupled to the merging portion 71. The plurality of first accommodation bodies 54 and the plurality of second accommodation bodies 56 are coupled to the merging portion 71. That is, the plurality of first discharge flow paths 51 and the plurality of second discharge flow paths 52 are coupled to the coupled portion 22 of the present example. Air bubbles, liquid, and the like flow into the merging portion 71 through the discharge flow path 21. The merging portion 71 may have a merging body 72 and a second flexible film 73.

The merging body 72 is coupled to the plurality of accommodation bodies. The merging body 72 is, for example, a resin case. The second flexible film 73 is attached to the merging body 72. The second flexible film 73 is, for example, a film having flexibility. The volume of the merging portion 71 changes due to the displacement of the second flexible film 73.

The coupled portion 22 has a plurality of operation plates. The coupled portion 22 has, for example, two operation plates. Specifically, the coupled portion 22 has a first pressing portion 74 and a second pressing portion 75. The first pressing portion 74 and the second pressing portion 75 of the present example are positioned inside the merging portion 71. The first pressing portion 74 and the second pressing portion 75 of the present example are provided side by side in a vertical direction, and are illustrated side by side in FIG. 2. The first pressing portion 74 and the second pressing portion 75 may be provided side by side in a horizontal direction.

The first pressing portion 74 can come into contact with one or more first opening/closing valve bodies 60. Specifically, the first pressing portion 74 can come into contact with the plurality of first shaft parts 62. In the present example, the first pressing portion 74 can come into contact with each of the four first shaft parts 62. The second pressing portion 75 can come into contact with one or more second opening/closing valve bodies 66. Specifically, the second pressing portion 75 can come into contact with the plurality of second shaft parts 68. In the present example, the second pressing portion 75 can come into contact with the four second shaft parts 68.

The first pressing portion 74 can be moved to open and close the first opening/closing portion 55. When the first pressing portion 74 approaches the first accommodation body 54, the first opening/closing valve body 60 is pressed by the first pressing portion 74. The first opening/closing valve body 60 is pressed by the first pressing portion 74, so that the first plate part 63 is separated from the first opening plate 59. As described above, in the present embodiment, the plurality of first discharge flow paths 51 are opened all at once by the first pressing portion 74.

The second pressing portion 75 can be moved to open and close the second opening/closing portion 57. When the second pressing portion 75 approaches the second accommodation body 56, the second opening/closing valve body 66 is pressed by the second pressing portion 75. The second opening/closing valve body 66 is pressed by the second pressing portion 75, so that the second plate part 69 is separated from the second opening plate 65. As described above, in the present example, the plurality of second discharge flow paths 52 are opened all at once by the second pressing portion 75.

The coupled portion 22 has an insertion portion 76. The coupling portion 26 is inserted into the insertion portion 76. The coupled portion 22 and the negative pressure generating section 25 are coupled to each other by inserting the coupling portion 26 into the insertion portion 76. That is, the plurality of discharge flow paths 21 and the negative pressure generating section 25 are coupled to each other by inserting the coupling portion 26 into the insertion portion 76. The insertion portion 76 has an insertion body 77, a valve portion 78, and a seal portion 79.

The insertion body 77 is coupled to the merging body 72. The inside of the insertion body 77 communicates with the inside of the merging body 72. The air bubbles and the liquid flowing into the merging body 72 flow into the insertion body 77. A third coupling port 80 is open in the insertion body 77. The coupling portion 26 is inserted into the third coupling port 80. The third coupling port 80 may be formed in a tapered shape such that a diameter at the back part decreases.

The valve portion 78 is positioned in the insertion body 77. The valve portion 78 opens and closes the coupled portion 22. The valve portion 78 normally closes the third coupling port 80. The coupled portion 22 is closed by the valve portion 78. The valve portion 78 opens the coupled portion 22 by inserting the coupling portion 26 into the insertion body 77. The valve portion 78 is separated from the third coupling port 80 by being pressed by the coupling portion 26 inserted into the insertion body 77, for example. As a result, the coupled portion 22 is opened.

The seal portion 79 is attached to the insertion body 77. The seal portion 79 is positioned at the third coupling port 80. When the coupling portion 26 is inserted into the third coupling port 80, the seal portion 79 seals the coupling portion 26 and the insertion body 77. The seal portion 79 comes into close contact with the outer peripheral surface of the coupling portion 26, for example, by inserting the coupling portion 26 into the insertion portion 76. As a result, the seal portion 79 seals the coupling portion 26 and the insertion body 77. As a result, the concern that the liquid leaks from the third coupling port 80 is reduced.

Next, the opening portion 30 will be described.

The opening portion 30 has a first lever 81, a second lever 82, and a switching member 83. The first lever 81 is a member that opens the first discharge flow path 51. The second lever 82 is a member that opens the second discharge flow path 52.

The first lever 81 can approach or move away from the coupled portion 22. The first lever 81 comes into contact with the first pressing portion 74 over the second flexible film 73 by approaching the coupled portion 22. The first lever 81 presses the first pressing portion 74 toward the first discharge flow path 51 by approaching the coupled portion 22. As a result, the plurality of first discharge flow paths 51 are opened all at once.

The second lever 82 can approach or move away from the coupled portion 22. The second lever 82 comes into contact with the second pressing portion 75 over the second flexible film 73 by approaching the coupled portion 22. The second lever 82 presses the second pressing portion 75 toward the second discharge flow path 52 by approaching the coupled portion 22. As a result, the plurality of second discharge flow paths 52 are opened all at once.

Figure 3:
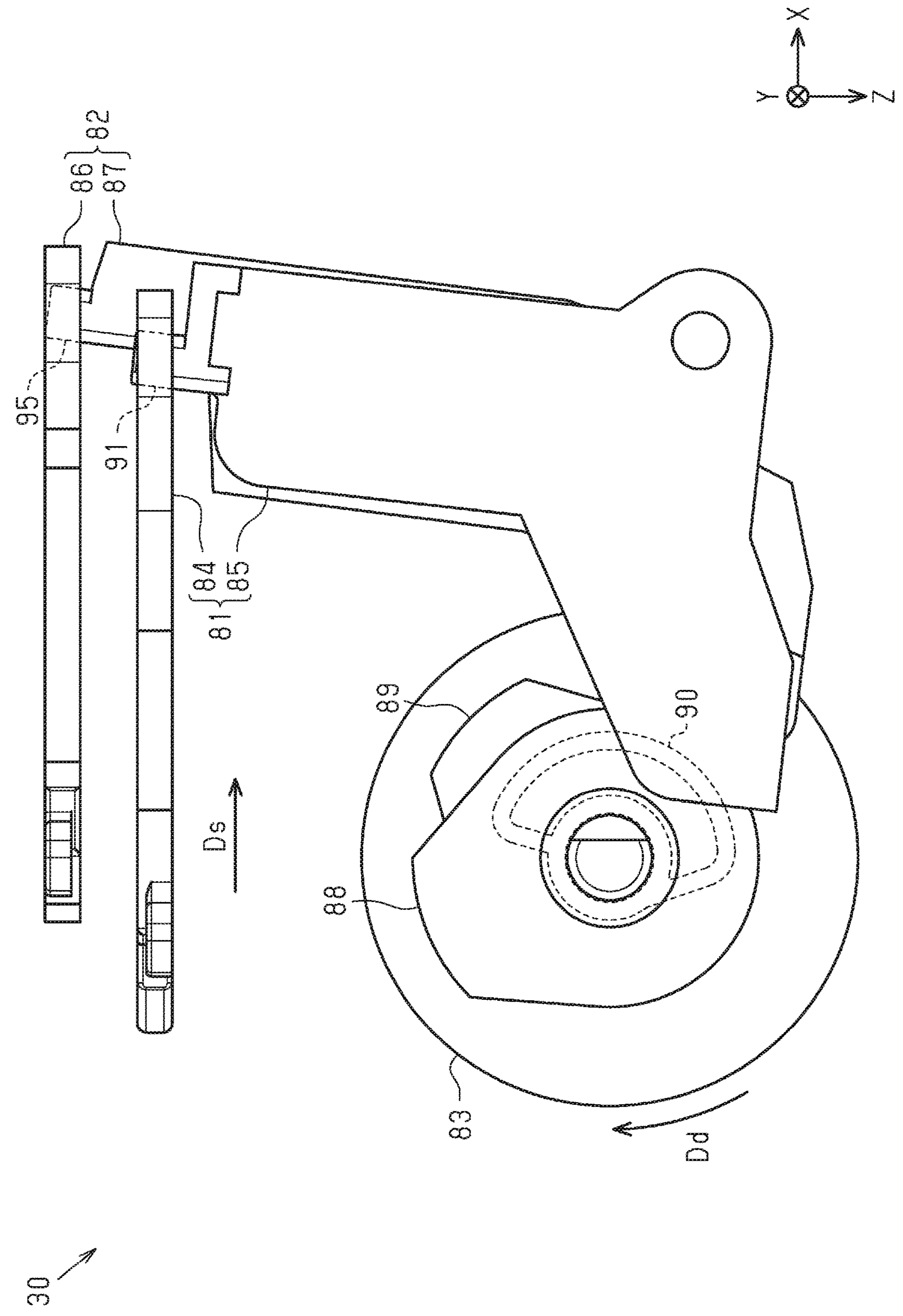
FIG. 3 is a front view illustrating the opening portion in a reference state.

As illustrated in FIG. 3, the first lever 81 and the second lever 82 have a valve opening lever and a cam lever, respectively. Specifically, the first lever 81 has a first valve opening lever 84 and a first cam lever 85. The second lever 82 has a second valve opening lever 86 and a second cam lever 87.

The switching member 83 of the present example is a cam member. The switching member 83 may have a first cam 88, a second cam 89, and a third cam 90. The switching member 83 can perform switching between a first state and a second state. The switching member 83 of the present example switches from a reference state to the first state and the second state.

A drive force may be transmitted to the switching member 83 from a drive source that drives the negative pressure generating section 25, for example. For example, the drive source may generate a negative pressure in the negative pressure generating section 25 by driving the forward rotation and drive the switching member 83 by driving the reverse rotation.

Figure 4:
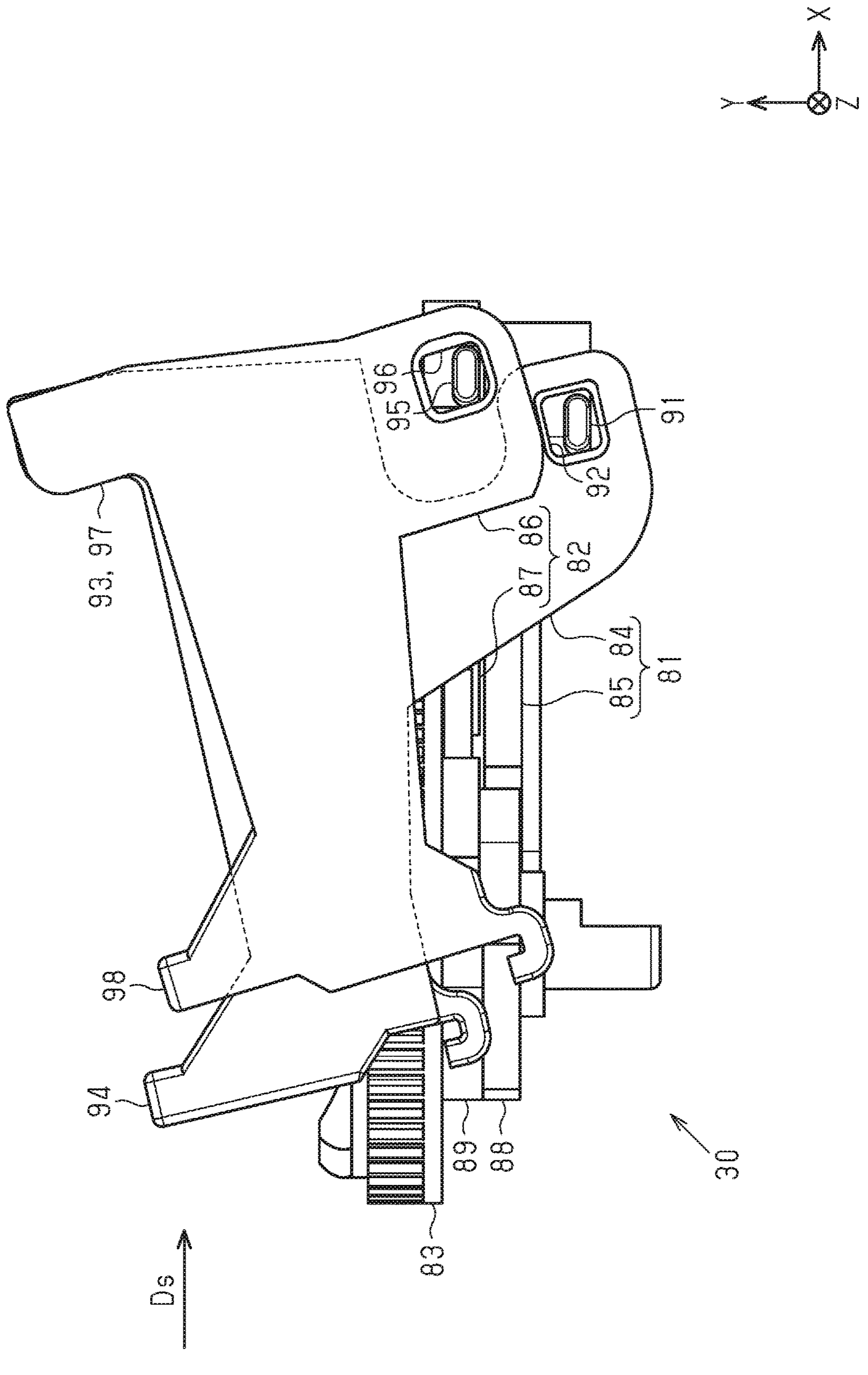
FIG. 4 is a plan view illustrating the opening portion in the reference state.

As illustrated in FIG. 4, the first cam lever 85 may have a first protruding portion 91. The first valve opening lever 84 may have a first hole 92. The first protruding portion 91 is inserted into the first hole 92. The first valve opening lever 84 is rotatable about the first protruding portion 91. The first valve opening lever 84 may have a first contact portion 93 and a first action portion 94. The first contact portion 93 can come into contact with the carriage 14. The first action portion 94 can come into contact with the second flexible film 73. The first valve opening lever 84 receives a force in a direction in which the first action portion 94 is separated from the carriage 14 by a spring (not illustrated).

The second cam lever 87 may have a second protruding portion 95. The first valve opening lever 84 may have a second hole 96. The second protruding portion 95 is inserted into the second hole 96. The second valve opening lever 86 is rotatable about the second protruding portion 95. The second valve opening lever 86 may have a second contact portion 97 and a second action portion 98. The second contact portion 97 can come into contact with the carriage 14. The second action portion 98 can come into contact with the second flexible film 73. The second valve opening lever 86 receives a force in a direction in which the second action portion 98 is separated from the carriage 14 by a spring (not illustrated).

Reference State

Figure 5:
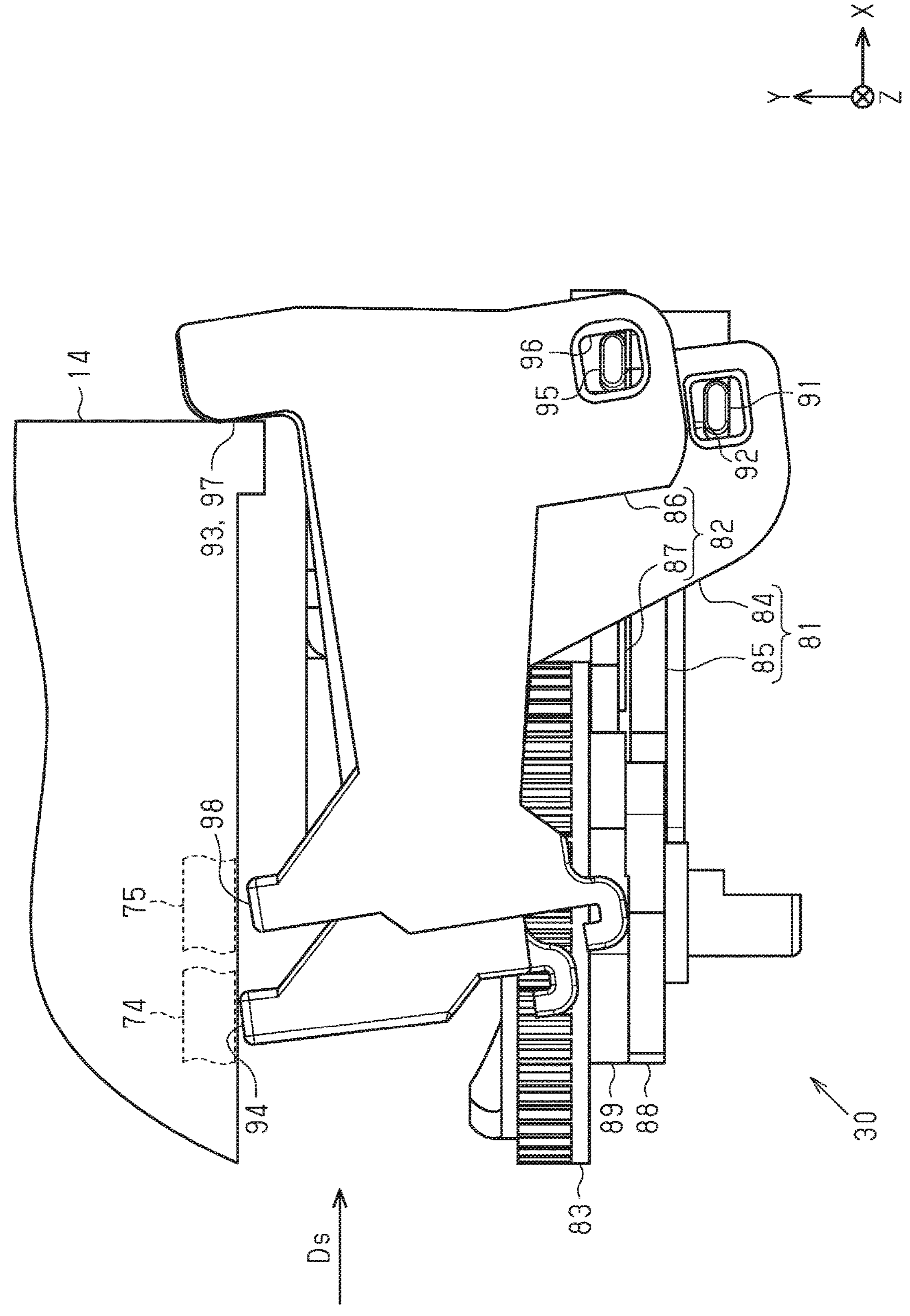
FIG. 5 is a plan view illustrating an opening portion and a carriage in the reference state.

As illustrated in FIGS. 3 to 5, a rotation phase of the switching member 83 in the case of the reference state is 0 degrees.

As illustrated in FIG. 3, when the switching member 83 is in the reference state, the first cam 88 does not press the first cam lever 85. The second cam 89 does not press the second cam lever 87.

As illustrated in FIGS. 3 and 4, when the switching member 83 is the reference state, the first cam lever 85, the second cam lever 87, the first valve opening lever 84, and the second valve opening lever 86 are positioned at the reference position.

As illustrated in FIG. 5, the carriage 14 moves in the scanning direction Ds and is positioned at a predetermined position to press the first contact portion 93 and the second contact portion 97. The first valve opening lever 84 rotates about the first protruding portion 91 when the first contact portion 93 is pressed by the carriage 14. The second valve opening lever 86 rotates about the second protruding portion 95 when the second contact portion 97 is pressed by the carriage 14. That is, the first lever 81 and the second lever 82 rotate in conjunction with the movement of the carriage 14.

When the switching member 83 is in the reference state, even when the first valve opening lever 84 pressed by the carriage 14 rotates, the first action portion 94 does not move the first pressing portion 74. When the switching member 83 is in the reference state, even when the second valve opening lever 86 pressed by the carriage 14 rotates, the second action portion 98 does not move the second pressing portion 75.

Therefore, the plurality of first discharge flow paths 51 and the plurality of second discharge flow paths 52 are closed.

The carriage 14 moves in the direction opposite to the scanning direction Ds and is separated from the first contact portion 93 and the second contact portion 97. When the carriage 14 is separated from the first contact portion 93, the first valve opening lever 84 rotates in the direction in which the first action portion 94 is separated from the carriage 14 by the force of a spring (not illustrated). When the carriage 14 is separated from the second contact portion 97, the second valve opening lever 86 rotates in a direction in which the second action portion 98 is separated from the carriage 14 by the force of a spring (not illustrated).

Second State

Figure 6:
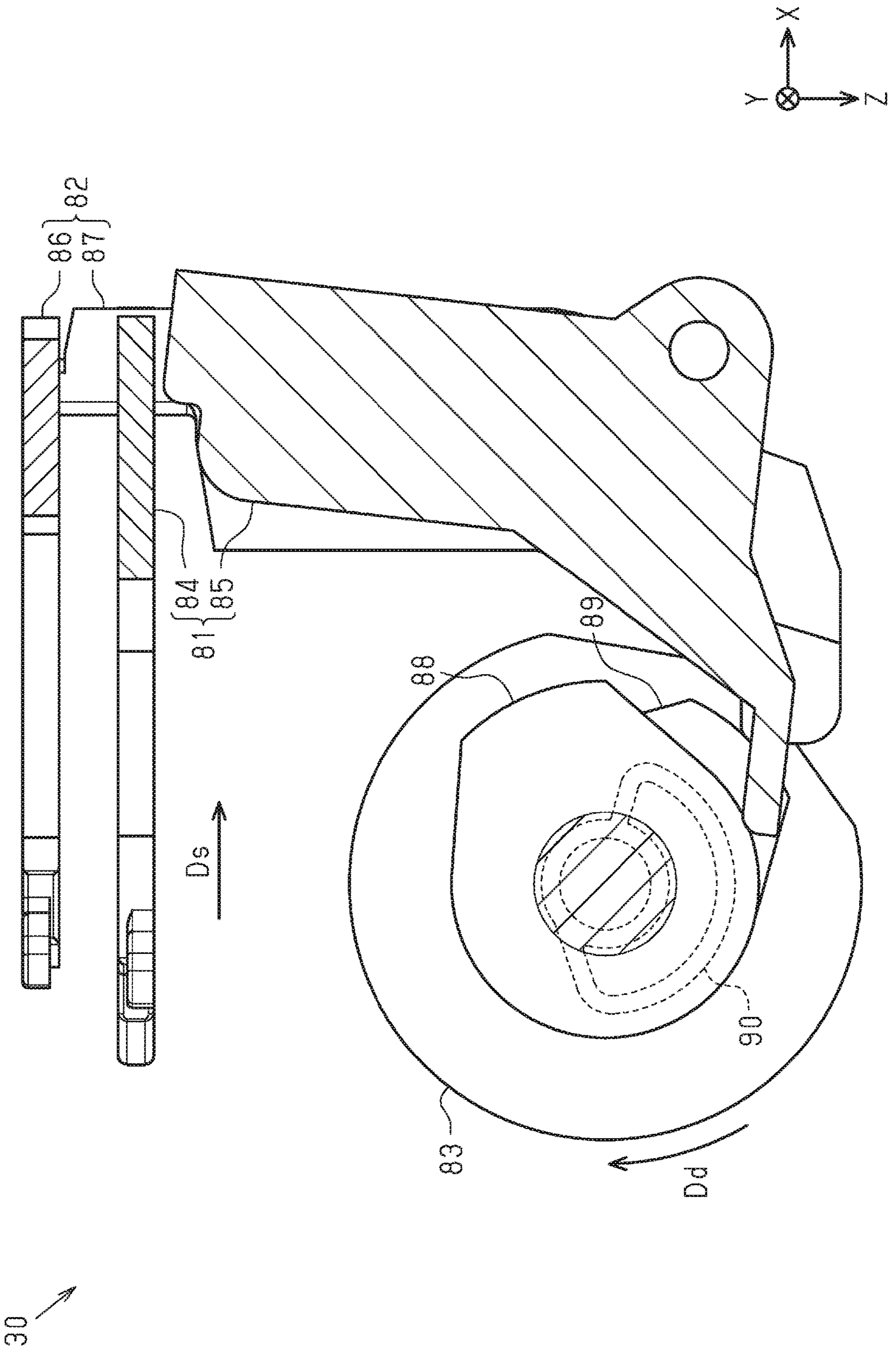
FIG. 6 is a front view illustrating the opening portion in a second state.
Figure 7:
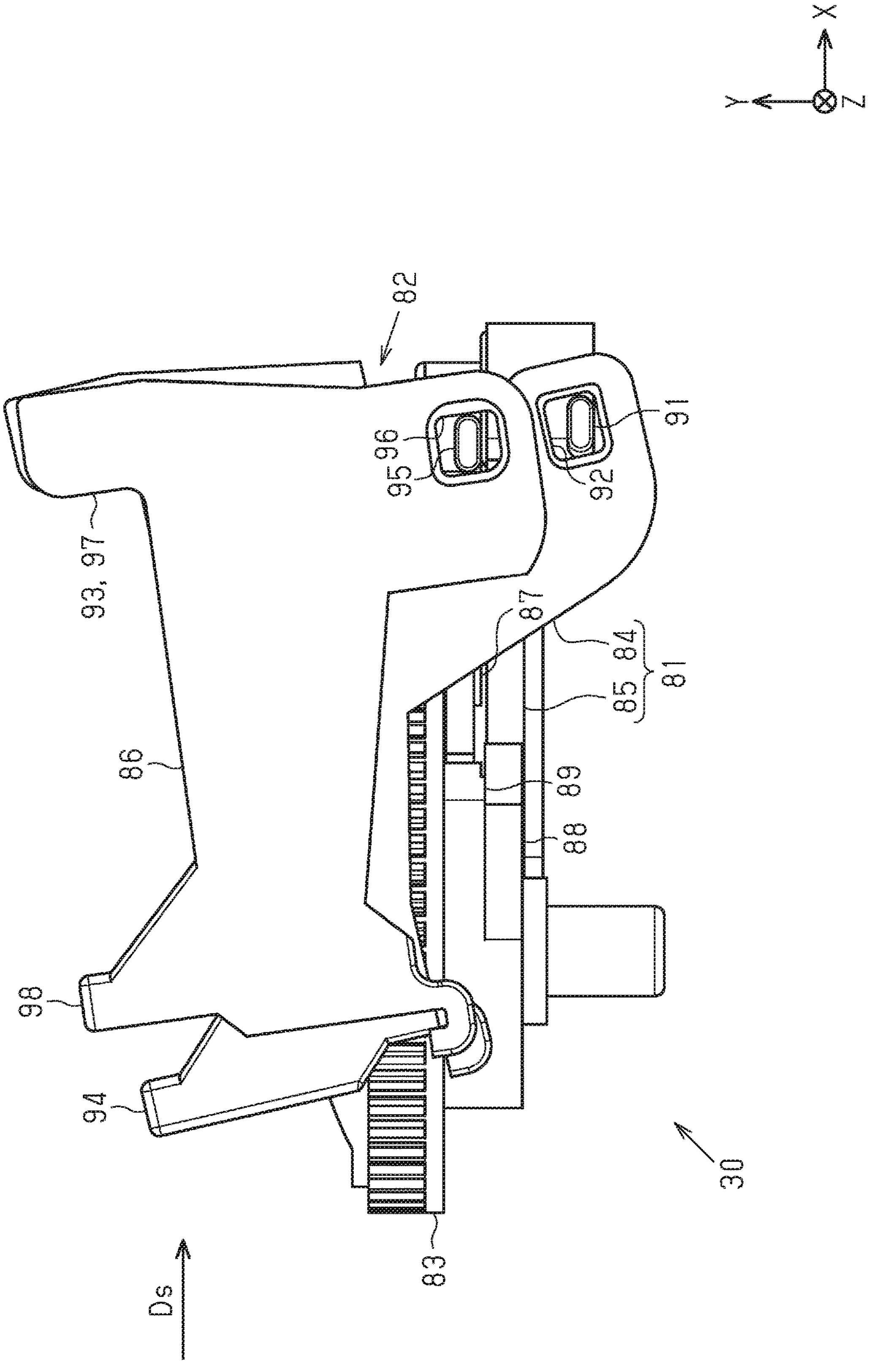
FIG. 7 is a plan view illustrating the opening portion in the second state.
Figure 8:
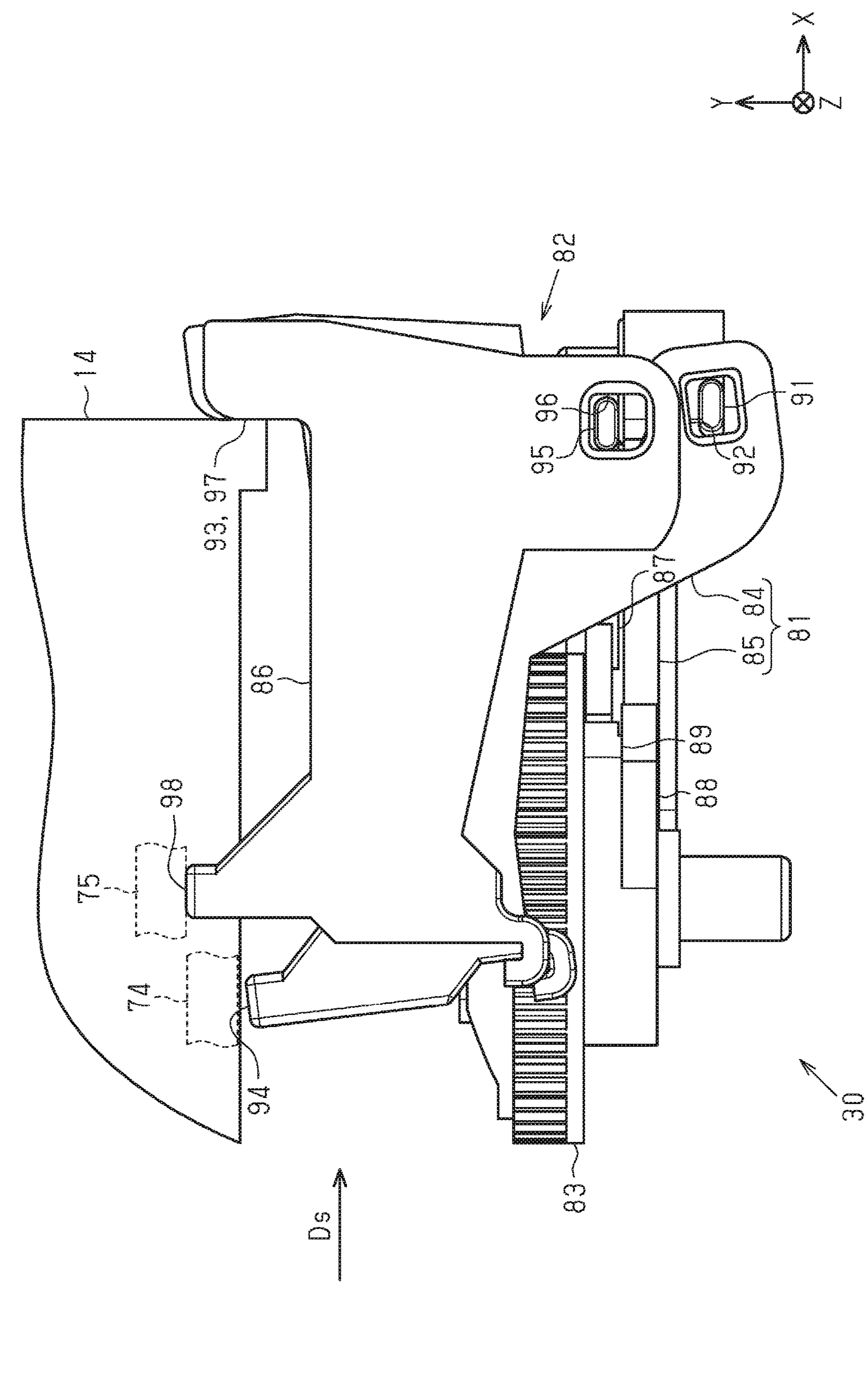
FIG. 8 is a plan view illustrating the opening portion and the carriage in the second state.

As illustrated in FIGS. 6 to 8, the switching member 83 switches to the second state by rotating in the drive direction Dd from the reference state. When the switching member 83 is in the second state, the rotation phase of the switching member 83 is, for example, 90 degrees.

As illustrated in FIG. 6, the switching member 83 can displace the position of the second lever 82. In the switching member 83, the rotating second cam 89 presses the second cam lever 87. When the second cam lever 87 is pressed by the second cam 89, the second cam lever 87 rotates in the counterclockwise direction in FIG. 6 about a shaft (not illustrated). The shaft of the second cam lever 87 may be provided parallel to the shaft of the first cam lever 85.

As illustrated in FIG. 7, the second cam lever 87 may move a rotation center of the second valve opening lever 86. When the second cam lever 87 rotates, the second protruding portion 95 and the second valve opening lever 86 are displaced to approach the switching member 83. The second protruding portion 95 and the second valve opening lever 86 may be displaced in the direction opposite to the scanning direction Ds.

As illustrated in FIG. 8, the carriage 14 presses the first contact portion 93 and the second contact portion 97 by moving to a predetermined position. The first valve opening lever 84 rotates about the first protruding portion 91 when the first contact portion 93 is pressed by the carriage 14. The second valve opening lever 86 rotates about the second protruding portion 95 when the second contact portion 97 is pressed by the carriage 14. That is, the first lever 81 and the second lever 82 rotate in conjunction with the movement of the carriage 14.

When the switching member 83 is in the second state, even when the first valve opening lever 84 pressed by the carriage 14 rotates, the first action portion 94 does not move the first pressing portion 74. In the second valve opening lever 86 which is pressed by the carriage 14 and rotates, the second action portion 98 moves the second pressing portion 75.

When the switching member 83 is in the second state, the second lever 82 can move the second pressing portion 75 in conjunction with the movement of the carriage 14. By moving the second pressing portion 75 by the second lever 82, the plurality of second discharge flow paths 52 are opened. At this time, the plurality of first discharge flow paths 51 are closed.

First State

Figure 9:
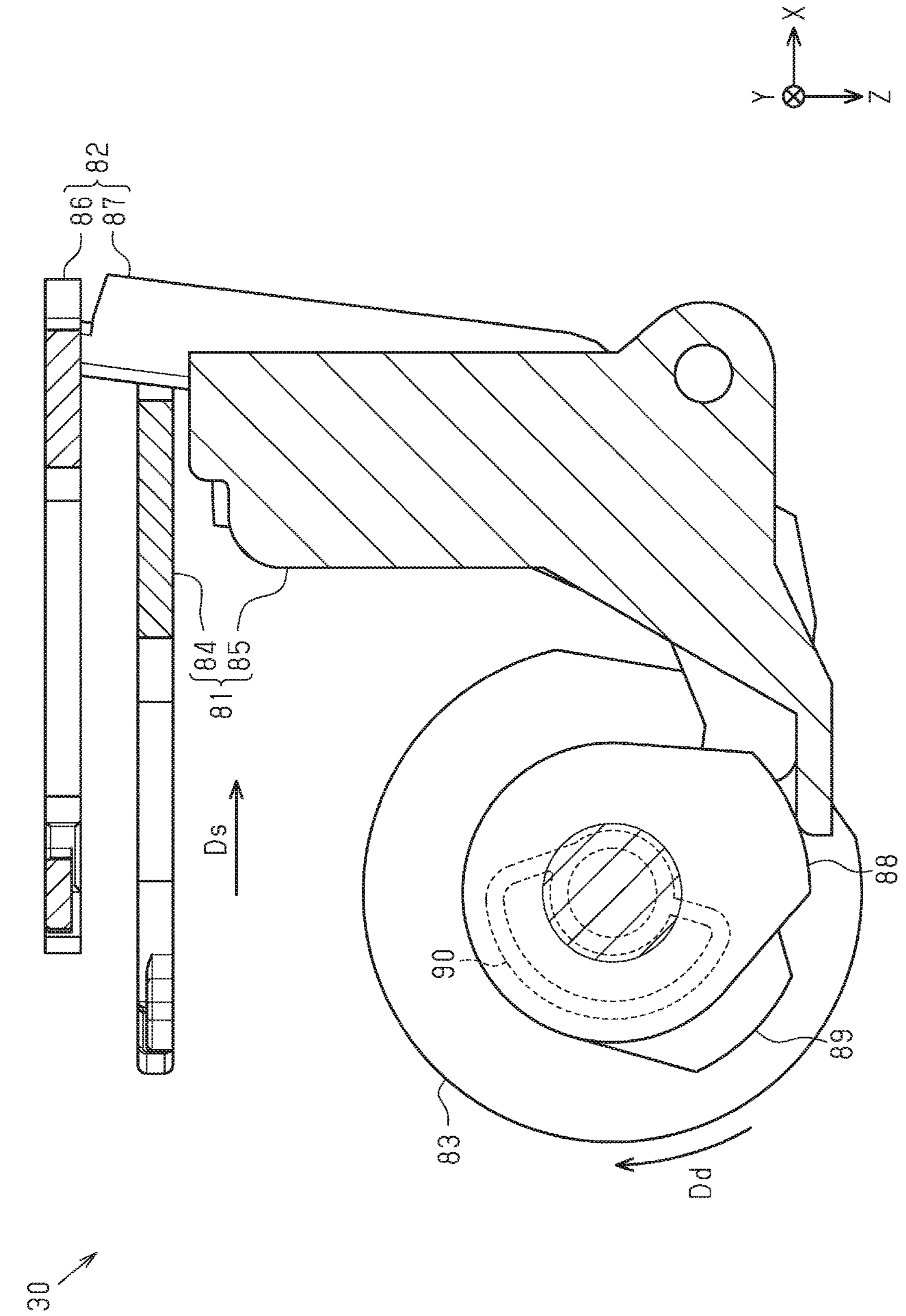
FIG. 9 is a front view illustrating the opening portion in a first state.
Figure 10:
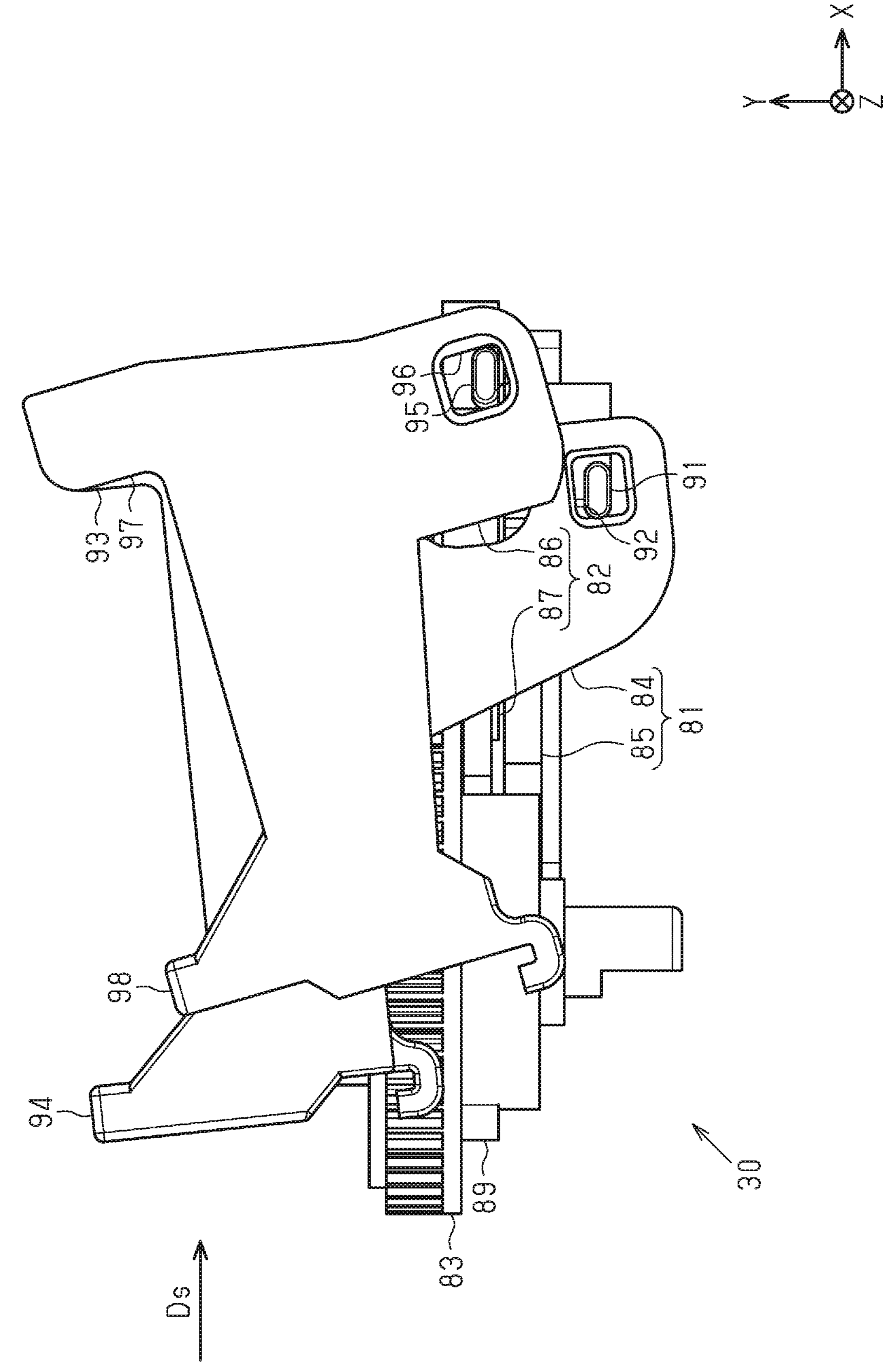
FIG. 10 is a plan view illustrating the opening portion in the first state.
Figure 11:
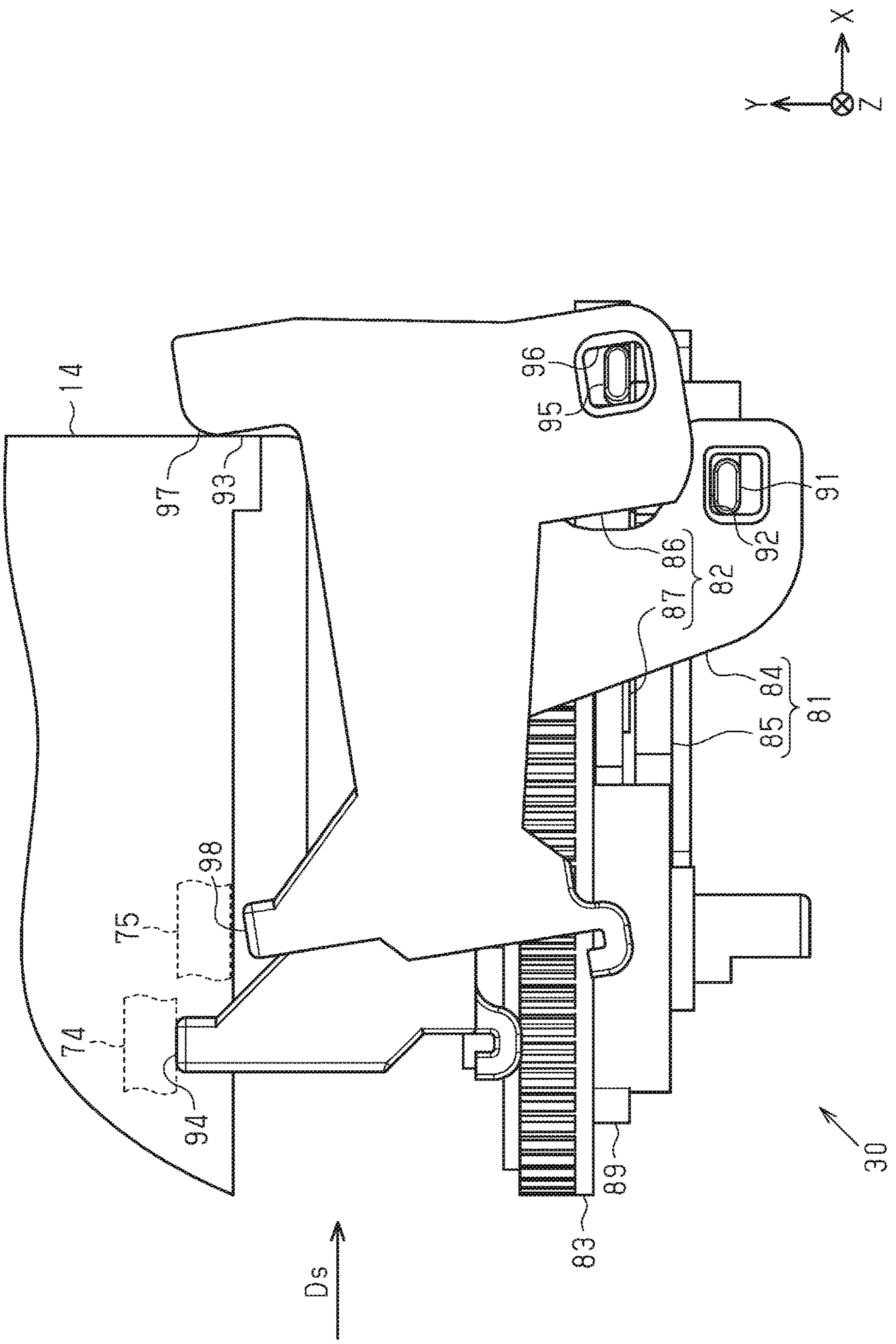
FIG. 11 is a plan view illustrating the opening portion and the carriage in the first state.

As illustrated in FIGS. 9 to 11, the switching member 83 switches to the first state by rotating in the drive direction Dd from the second state. When the switching member 83 is in the first state, the rotation phase of the switching member 83 is, for example, 180 degrees.

As illustrated in FIG. 9, the second cam 89 is displaced from the second cam lever 87. Therefore, the second cam lever 87 and the second valve opening lever 86 are returned to the reference position by the force of a spring (not illustrated).

The switching member 83 can displace the position of the first lever 81. In the switching member 83, the rotating first cam 88 presses the first cam lever 85. The first cam lever 85 rotates counterclockwise about the shaft in FIG. 9 by being pressed by the first cam 88.

As illustrated in FIG. 10, the first cam lever 85 may move the rotation center of the first valve opening lever 84. When the first cam lever 85 rotates, the first protruding portion 91 and the first valve opening lever 84 are displaced to approach the switching member 83. The first protruding portion 91 and the first valve opening lever 84 may be displaced in the direction opposite to the scanning direction Ds.

As illustrated in FIG. 11, the carriage 14 presses the first contact portion 93 and the second contact portion 97 by moving to a predetermined position. The first valve opening lever 84 rotates about the first protruding portion 91 when the first contact portion 93 is pressed by the carriage 14. The second valve opening lever 86 rotates about the second protruding portion 95 when the second contact portion 97 is pressed by the carriage 14.

When the switching member 83 is in the first state, the first action portion 94 of the first valve opening lever 84, which is pressed by the carriage 14 and rotates, moves the first pressing portion 74. Even when the second valve opening lever 86 pressed by the carriage 14 rotates, the second action portion 98 does not move the second pressing portion 75.

That is, when the switching member 83 is in the first state, the first lever 81 can move the first pressing portion 74 in conjunction with the movement of the carriage 14. By moving the first pressing portion 74 by the first lever 81, the plurality of first discharge flow paths 51 are opened. At this time, the plurality of second discharge flow paths 52 are closed.

In the present example, both the plurality of first discharge flow paths 51 and the plurality of second discharge flow paths 52 are not opened at the same time. Therefore, the first opening/closing portion 55 and the second opening/closing portion 57 are individually opened/closed by interlocking with the movement of the carriage 14. As a result, the air bubbles are individually sucked in the first storage chamber 34 and the second storage chamber 35.

Next, the coupling portion 26 will be described.

Figure 12:
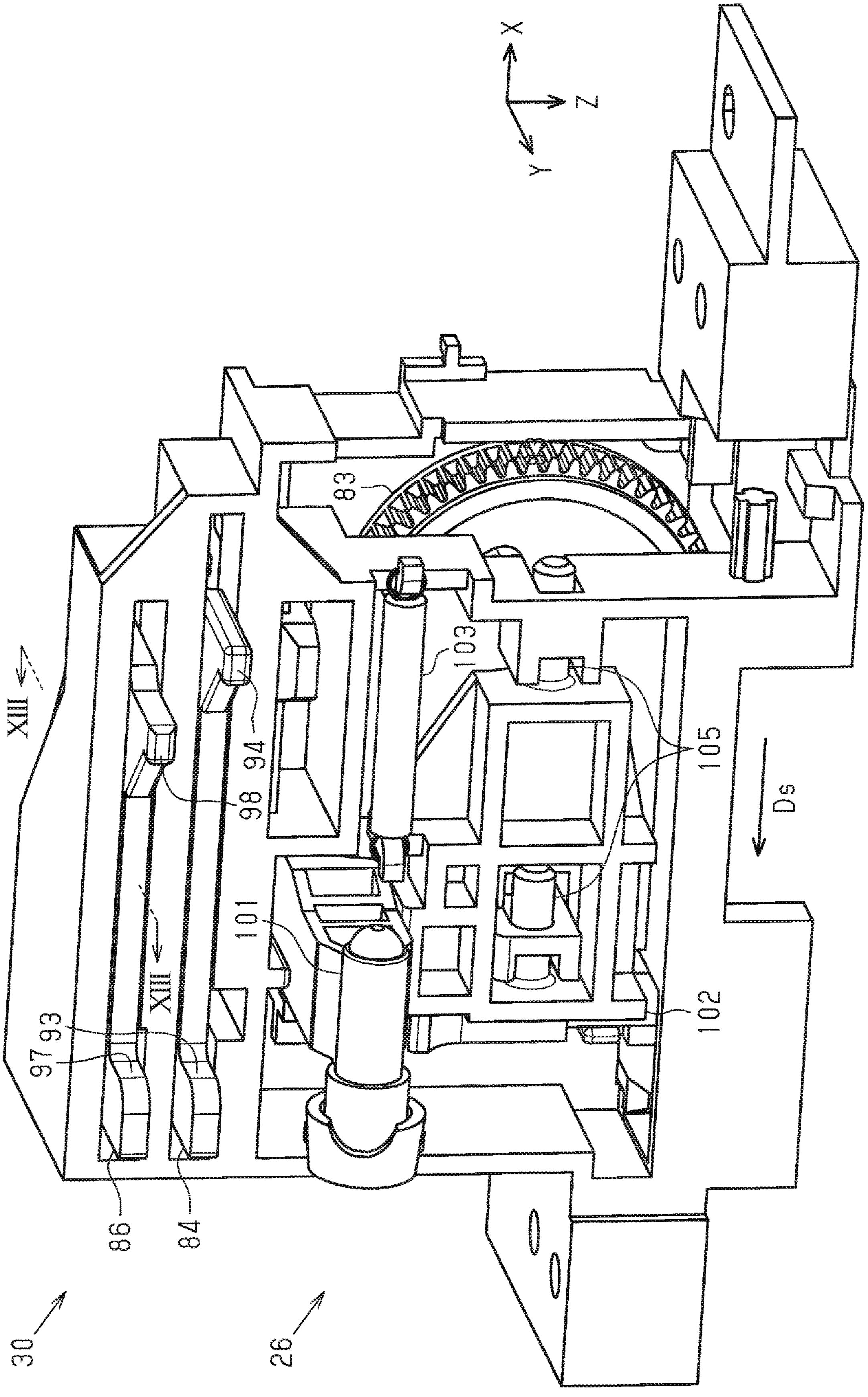
FIG. 12 is a perspective view of the opening portion and a coupling portion.

As illustrated in FIG. 12, the coupling portion 26 may have a suction pipe 101, a support portion 102, and a spring 103. The coupling portion 26 can be coupled to and separated from the coupled portion 22. The coupling portion 26 is coupled to the coupled portion 22 by moving the carriage 14 to a predetermined position. The coupling portion 26 is separated from the coupled portion 22 when the carriage 14 is separated from the predetermined position.

The suction pipe 101 may be formed to have a rounded tip. The support portion 102 supports the suction pipe 101. The support portion 102 may be provided to be slidable and movable in the scanning direction Ds and the direction opposite to the scanning direction Ds. The support portion 102 may have a first shaft 104 and a second shaft 105 illustrated in FIG. 13. The second shaft 105 may be divided into a plurality of parts.

Figure 13:
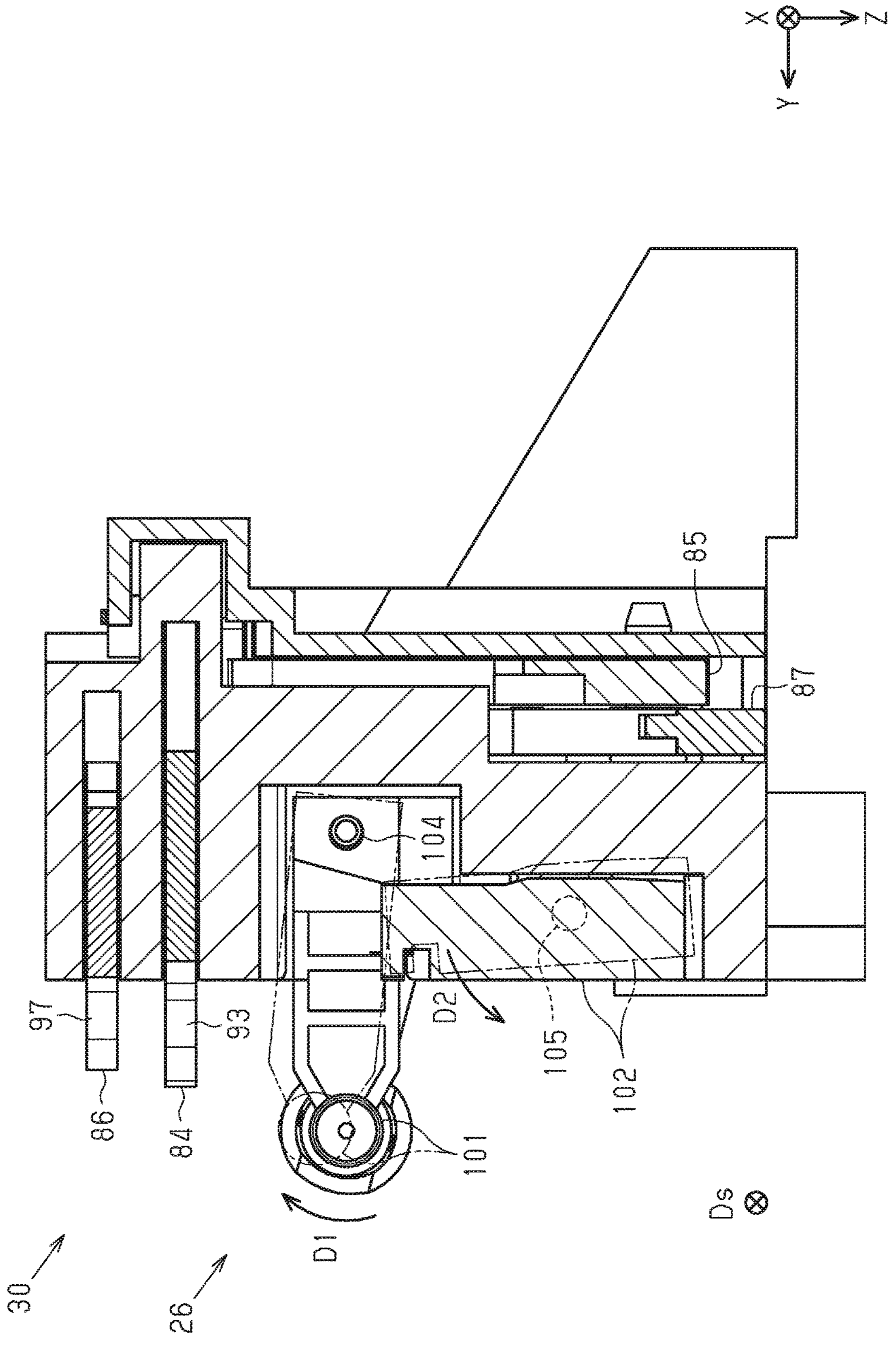
FIG. 13 is a sectional view taken along line XIII-XIII in FIG. 12.

As illustrated in FIG. 13, the suction pipe 101 may be rotatable in a first direction D1 different from the scanning direction Ds. The first direction D1 is a rotation direction about the first shaft 104. The support portion 102 may be rotatable in a second direction D2 different from the scanning direction Ds and the first direction D1. The second direction D2 is a rotation direction about the second shaft 105. The suction pipe 101 may be guided to the third coupling port 80 when coupled to the coupled portion 22. The position of the suction pipe 101 with respect to the coupled portion 22 is adjusted by moving in the first direction D1 and the second direction D2 along the third coupling port 80.

Figure 14:
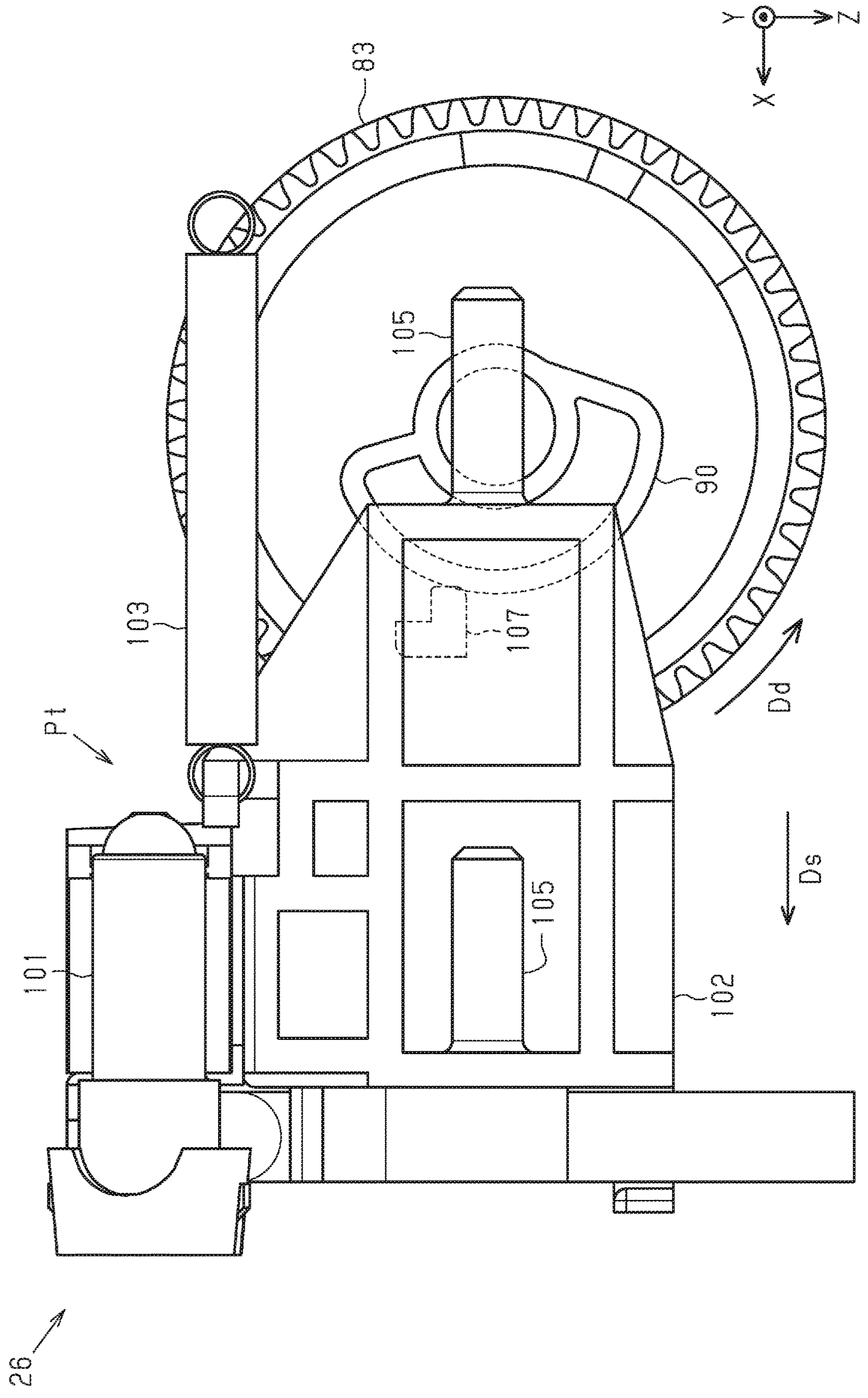
FIG. 14 is a rear view illustrating the coupling portion in a reference state.

As illustrated in FIG. 14, the support portion 102 may have a cam follower 107. The cam follower 107 is, for example, a protrusion that comes into contact with the third cam 90. When the switching member 83 is in the reference state, the support portion 102 is positioned at a temporary suction position Pt.

Figure 15:
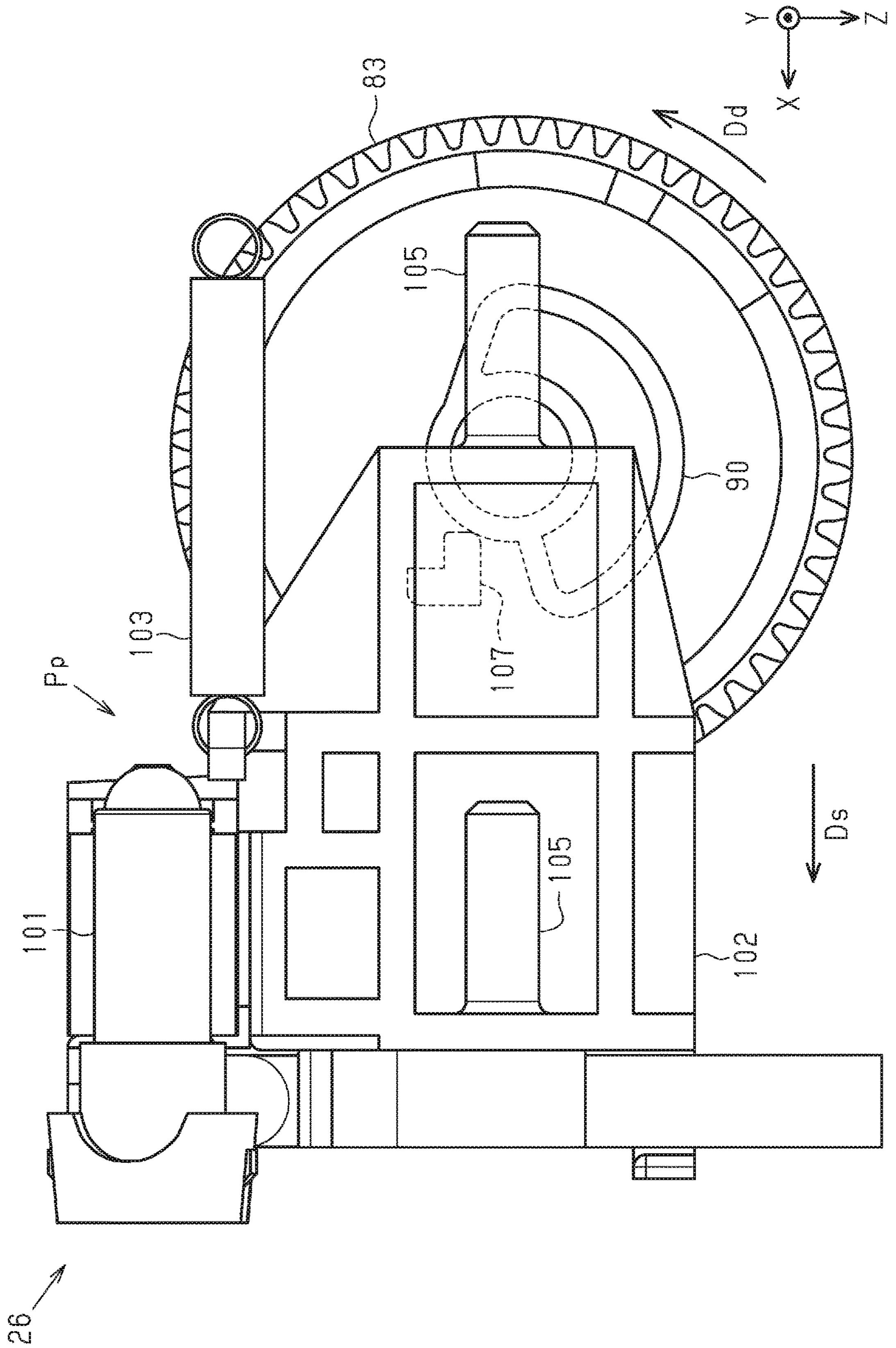
FIG. 15 is a rear view illustrating the coupling portion in the second state.

As illustrated in FIG. 15, when the switching member 83 is in the second state, the support portion 102 is positioned at a main suction position Pp.

Figure 16:
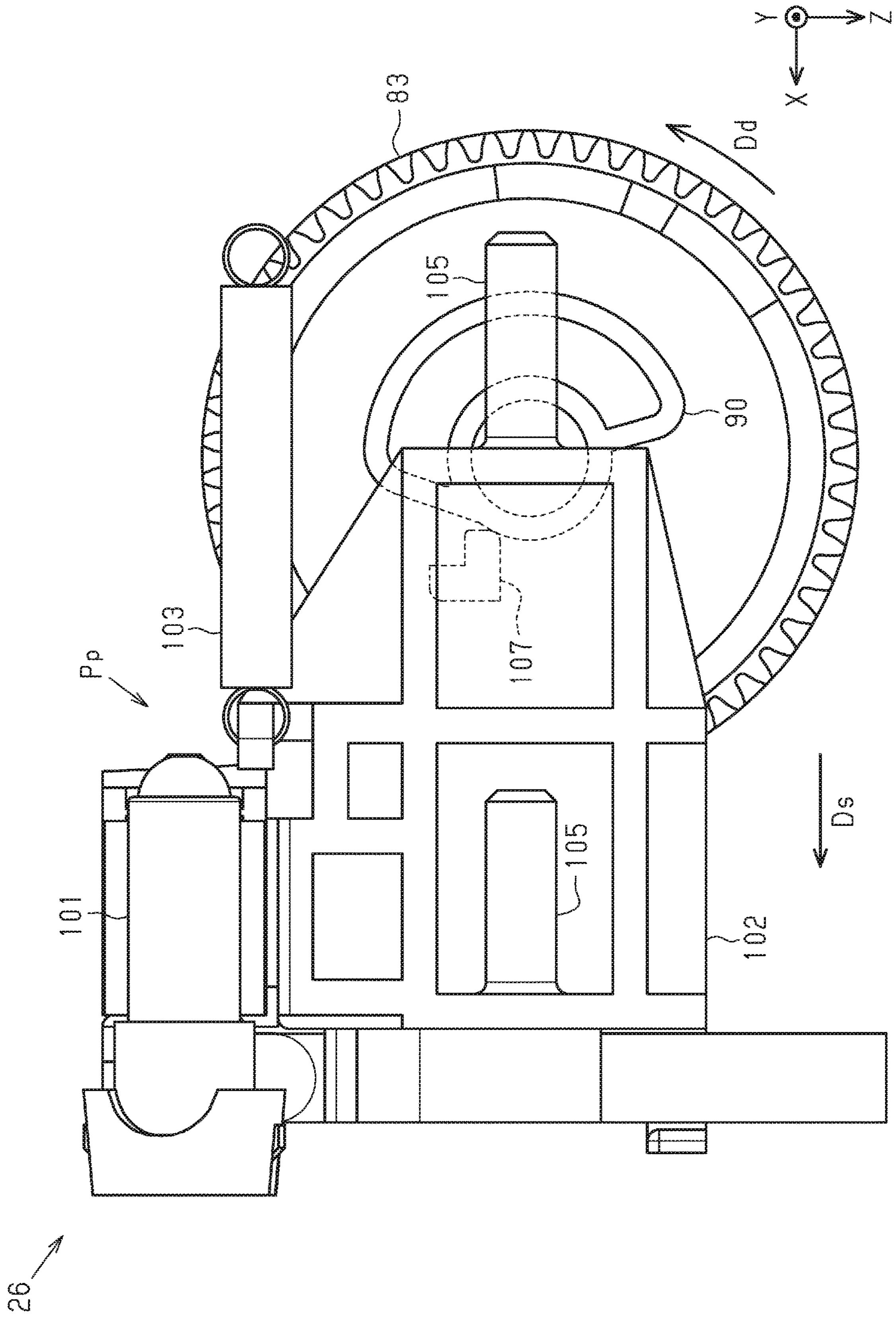
FIG. 16 is a rear view illustrating the coupling portion in the first state.

As illustrated in FIG. 16, when the switching member 83 is in the first state, the support portion 102 is positioned at the main suction position Pp. The main suction position Pp is a position closer to the switching member 83 than the temporary suction position Pt.

Control Method

Next, a control method of the liquid ejection apparatus 11 will be described.

When the air bubbles are discharged, the control section 32 moves the carriage 14 to a predetermined position. At this time, the switching member 83 is in the reference state.

As illustrated in FIG. 5, when the switching member 83 is in the reference state, the first pressing portion 74 and the second pressing portion 75 do not move even when the carriage 14 is positioned at a predetermined position. Therefore, the first discharge flow path 51 and the second discharge flow path 52 are not opened.

As illustrated in FIG. 14, when the switching member 83 is in the reference state, the support portion 102 is positioned at the temporary suction position Pt. When the carriage 14 moves to a predetermined position, the coupling portion 26 is coupled to the coupled portion 22. That is, the carriage 14 couples the coupling portion 26 to the coupled portion 22 by moving to the predetermined position, and does not move the first pressing portion 74 and the second pressing portion 75. In other words, the control section 32 moves the carriage 14 to a predetermined position to couple the coupling portion 26 to the coupled portion 22 without moving the first pressing portion 74 and the second pressing portion 75.

The coupling of the coupling portion 26 and the coupled portion 22 means that the suction pipe 101 is inserted into the insertion portion 76 to open the valve portion 78. First, the coupling portion 26 comes into contact with the seal portion 79 as the carriage 14 moves. When the carriage 14 further moves, the coupling portion 26 comes into contact with the valve portion 78 while coming into contact with the seal portion 79. When the carriage 14 further moves, the coupling portion 26 opens the valve portion 78 and is inserted into the insertion portion 76.

When the negative pressure generating section 25 is driven in a state where the coupling portion 26 and the coupled portion 22 are coupled to each other, the negative pressure acts on the coupled portion 22. Specifically, the inside of the merging portion 71 is sucked. Before the control section 32 opens the first discharge flow path 51 and the second discharge flow path 52 after positioning the carriage 14 at a predetermined position, the control section 32 applies a negative pressure to the coupled portion 22.

After the negative pressure of the negative pressure generating section 25 reaches the predetermined pressure, the control section 32 rotates the switching member 83 in the drive direction Dd to set the switching member 83 to the second state. The control section 32 causes the switching member 83 to enter the second state in a state where the carriage 14 is positioned at the predetermined position.

As illustrated in FIG. 15, when the switching member 83 enters the second state, the support portion 102 and the suction pipe 101 move to the main suction position Pp. The suction pipe 101 is further inserted into the depth of the insertion portion 76.

As illustrated in FIG. 8, when the switching member 83 enters the second state, the second lever 82 moves the second pressing portion 75 to open the second opening/closing portion 57. When the switching member 83 is in the second state, the control section 32 moves the second pressing portion 75 by the second lever 82 interlocked with the movement of the carriage 14, and discharges the air bubbles from the second storage chamber 35. The merging portion 71 is made to have a negative pressure in advance before the switching member 83 enters the second state. When the second opening/closing portion 57 is opened, the negative pressure generating section 25 applies a negative pressure to the second discharge flow path 52. The negative pressure generating section 25 applies a negative pressure to the second storage chamber 35 via the suction pipe 101, the insertion portion 76, the merging portion 71, and the second discharge flow path 52. The air bubbles in the second storage chamber 35 are discharged via the second discharge flow path 52.

After the air bubbles in the second storage chamber 35 are discharged, the control section 32 rotates the switching member 83 in the drive direction Dd to set the switching member 83 to the first state. The control section 32 causes the switching member 83 to enter the first state in a state where the carriage 14 is positioned at the predetermined position.

As illustrated in FIG. 16, even when the switching member 83 is switched from the second state to the first state, the support portion 102 is positioned at the main suction position Pp. That is, the support portion 102 does not move in the switching of the switching member 83 from the second state to the first state. The coupling portion 26 maintains a coupled state with the coupled portion 22. The merging portion 71 is kept at a negative pressure.

As illustrated in FIG. 11, when the switching member 83 enters the first state, the second lever 82 is separated from the second pressing portion 75. The second lever 82 moves the second pressing portion 75 away from the second opening/closing portion 57 to close the second opening/closing portion 57.

The first lever 81 moves the first pressing portion 74 to open the first opening/closing portion 55. When the switching member 83 is in the first state, the control section 32 moves the first pressing portion 74 by the first lever 81 interlocked with the movement of the carriage 14, and discharges the air bubbles from the first storage chamber 34. When the first opening/closing portion 55 is opened, the negative pressure generating section 25 applies a negative pressure to the first discharge flow path 51. The negative pressure generating section 25 applies a negative pressure to the first storage chamber 34 via the suction pipe 101, the insertion portion 76, the merging portion 71, and the first discharge flow path 51. The air bubbles in the first storage chamber 34 are discharged via the first discharge flow path 51.

Each of the plurality of discharge flow paths 21 has the resistance portion 53. Due to the resistance portion 53, there is a difference in the pressure loss in the discharge flow path 21 between when the liquid flows and when the air bubbles flow. When air bubbles flow through the discharge flow path 21, the pressure loss is smaller than when the liquid flows through the discharge flow path 21. Therefore, the negative pressure by the negative pressure generating section 25 intensively acts on the discharge flow path 21 through which the air bubbles flow. Therefore, the liquid is less likely to flow from the storage chamber having no air bubbles. As a result, even when the negative pressure is collectively applied to the plurality of storage chambers, the air bubbles are preferentially sucked from the storage chamber having air bubbles among the plurality of storage chambers.

After the air bubbles in the first storage chamber 34 are discharged, the control section 32 may rotate the switching member 83 in the drive direction Dd to set the switching member 83 to the reference state. The control section 32 causes the switching member 83 to enter the reference state in a state where the carriage 14 is positioned at the predetermined position.

As illustrated in FIG. 5, when the switching member 83 enters the reference state, the first lever 81 and the second lever 82 are separated from the first pressing portion 74 and the second pressing portion 75. Therefore, the first opening/closing portion 55 and the second opening/closing portion 57 are closed.

The control section 32 may stop driving the negative pressure generating section 25 after setting the switching member 83 to the reference state. The control section 32 may discharge air bubbles from the first storage chamber 34 and the second storage chamber 35, position the carriage 14 at a predetermined position to close the first discharge flow path 51 and the second discharge flow path 52, and then, stop the action of the negative pressure on the coupled portion 22.

Action of Embodiment

The action of the present embodiment will be described. When a plurality of storage chambers are provided in the supply flow path 17, the amount of air bubbles may be biased. For example, air bubbles are more likely to accumulate in the second storage chamber 35 upstream of the filter 44 than in the first storage chamber 34 downstream of the filter 44. However, when the switching member 83 switches between the first state and the second state, a negative pressure is separately applied to the first storage chamber 34 and the second storage chamber 35.

Effect of Embodiment

The effect of the present embodiment will be described.

1-1 When the switching member 83 is in the first state, air bubbles can be sucked from the first storage chamber 34. When the switching member 83 is in the second state, air bubbles can be sucked from the second storage chamber 35. That is, since the air bubbles can be individually sucked from each storage chamber depending on the state of the switching member 83, the consumption of the liquid can be suppressed when the air bubbles are discharged.

1-2 Each of the first lever 81 and the second lever 82 has the valve opening lever and the cam lever. Therefore, an operational load of the carriage 14 can be reduced as compared with the case where the first pressing portion 74 and the second pressing portion 75 are moved only by the moving force of the carriage 14.

1-3 The air bubbles trapped in the filter 44 accumulate in the second storage chamber 35. In the first storage chamber 34, air bubbles that appear after passing through the filter 44 in a state of being dissolved in the liquid are accumulated. Therefore, in the first storage chamber 34 and the second storage chamber 35, the bias of the amount of air bubbles tends to increase. However, since the first storage chamber 34 and the second storage chamber 35 can be individually sucked depending on the state of the switching member 83, the air bubbles can be appropriately discharged.

1-4 When the carriage 14 moves to the predetermined position, the coupling portion 26 and the coupled portion 22 are coupled to each other, but the first pressing portion 74 and the second pressing portion 75 are not moved. Therefore, it is possible to perform the coupling between the coupling portion 26 and the coupled portion 22 and the opening and closing of the first discharge flow path 51 and the second discharge flow path 52 at different timings.

1-5 The suction pipe 101 supported by the support portion 102 is rotatable in the first direction D1 and the second direction D2. Therefore, even when the positions of the coupling portion 26 and the coupled portion 22 deviate due to aged deterioration or the like, for example, the coupling portion 26 can be coupled to the coupled portion 22.

1-6 After coupling the coupling portion 26 and the coupled portion 22, a negative pressure is applied to the coupled portion 22 before the first discharge flow path 51 and the second discharge flow path 52 are opened. Therefore, by applying a negative pressure to the coupled portion 22 first, it is possible to reduce the possibility of a backflow when the first discharge flow path 51 and the second discharge flow path 52 are opened.

1-7 The action of the negative pressure on the coupled portion 22 is stopped after the first discharge flow path 51 and the second discharge flow path 52 are closed. Therefore, it is possible to reduce the possibility that a backflow occurs in the first discharge flow path 51 and the second discharge flow path 52.

Modification Examples

The present embodiment can be changed and implemented as follows. The present embodiment and the following modification examples can be implemented in combination with each other within a technically consistent range.

- The control section 32 may move the carriage 14 to a predetermined position after setting the switching member 83 to the first state. The control section 32 may move the carriage 14 from the predetermined position while keeping the switching member 83 in the first state.
- The control section 32 may move the carriage 14 to a predetermined position after setting the switching member 83 to the second state. The control section 32 may move the carriage 14 from the predetermined position while keeping the switching member 83 in the second state.
- The control section 32 may stop driving the negative pressure generating section 25 before closing the first opening/closing portion 55 and the second opening/closing portion 57. The control section 32 may stop the action of the negative pressure on the coupled portion 22 before closing the first discharge flow path 51 and the second discharge flow path 52.
- The control section 32 may drive the negative pressure generating section 25 after opening the first opening/closing portion 55 or the second opening/closing portion 57. The control section 32 may apply a negative pressure to the coupled portion 22 after opening the first discharge flow path 51 or the second discharge flow path 52.

The coupling portion 26 may not include the movable support portion 102. The coupled portion 22 and the coupling portion 26 may be coupled to each other while the carriage 14 moves to a predetermined position. The carriage 14 may move to a predetermined position after temporarily stopping at the position where the tip of the suction pipe 101 is coupled to the coupled portion 22. The negative pressure generating section 25 may apply a negative pressure to the coupled portion 22 when the carriage 14 is temporarily stopped. By moving to the suction pipe 101 to a predetermined position, the suction pipe 101 may be inserted into the coupled portion 22.

The first storage chamber 34 may be provided upstream of the second storage chamber 35.

Three or more storage chambers may be provided in the supply flow path 17.

The switching member 83 may not include at least one of the first cam lever 85 and the second cam lever 87. The switching member 83 may directly move at least one of the first valve opening lever 84 and the second valve opening lever 86.

The liquid ejection apparatus 11 may be a liquid ejection apparatus which ejects a liquid other than the ink. Examples of a state of the liquid ejected as a minute amount of liquid droplets from the liquid ejection apparatus include grain-like, teardrop-like, and thread-like tailing liquids. The liquid referred here may be any material as long as the material can be ejected from the liquid ejection apparatus. For example, the liquid may be in any state as long as the substance is in a liquid phase, and includes a fluid body, such as a liquid material having high or low viscosity, sol, gel water, other inorganic solvent, organic solvent, solution, liquid resin, or liquid metal (metallic melt). The liquid includes not only a liquid as one state of a substance but also a substance in which particles of a functional material composed of a solid material, such as a pigment and metal particles are dissolved, dispersed, or mixed in a solvent, and the like. Representative examples of the liquid include ink, liquid crystal, and the like as described in the above embodiment. Here, the ink includes various types of liquid compositions, such as general water-based ink and oil-based ink, gel ink, hot melt ink, and the like. A specific example of the liquid ejection apparatus includes an apparatus which ejects the liquid containing dispersed or dissolved materials, such as electrode materials or coloring materials used for manufacturing liquid crystal displays, electroluminescence displays, surface emitting displays, or color filters. The liquid ejection apparatus may be an apparatus which ejects a bioorganic material used for biochip manufacturing, an apparatus which ejects a liquid that serves as a sample used as a precision pipette, a textile printing apparatus, a micro dispenser, or the like. The liquid ejection apparatus may be an apparatus that ejects lubricating oil to a precision machine such as a watch or a camera in a pinpoint manner, or an apparatus that ejects a transparent resin liquid such as an ultraviolet curable resin onto a substrate in order to form a micro hemispherical lens, an optical lens, or the like used for an optical communication element or the like. The liquid ejection apparatus may be an apparatus that ejects an acid or alkali etching solution in order to etch a substrate or the like.

Definition

The expression "at least one" used in the present specification means "one or more" of the desired options. As an example, the expression of "at least one" used in the present specification means "only one option" or "both of two options" when the number of options is two. In another example, the expression of "at least one" used in the present specification means "only one option" or "a combination of any two or more options" when the number of options is three or more.

APPENDIX

Hereinafter, the technical ideas and the actions and effects grasped from the above-described embodiments and modification examples will be described.

A A liquid ejection apparatus including: a liquid ejection head ejecting a liquid from a nozzle; a liquid storage portion having a first storage chamber and a second storage chamber and configured to store the liquid supplied from a liquid supply source to the liquid ejection head; a first discharge flow path through which air bubbles are discharged from the first storage chamber; a second discharge flow path through which air bubbles are discharged from the second storage chamber; a carriage on which the liquid ejection head, the liquid storage portion, the first discharge flow path, and the second discharge flow path are mounted and which is configured to reciprocate in a scanning direction; a coupling portion configured to be coupled to and separated from a coupled portion coupled to the first discharge flow path and the second discharge flow path; a negative pressure generating section coupled to the coupling portion to apply a negative pressure to the first discharge flow path and the second discharge flow path; a first opening/closing portion configured to open and close the first discharge flow path; a second opening/closing portion configured to open and close the second discharge flow path; a first pressing portion configured to move to open and close the first opening/closing portion; a second pressing portion configured to move to open and close the second opening/closing portion; a first lever rotating in conjunction with a movement of the carriage; a second lever rotating in conjunction with the movement of the carriage; and a switching member configured to switch between a first state and a second state and displace positions of the first lever and the second lever, in which the first lever is configured to move the first pressing portion in conjunction with the movement of the carriage when the switching member is in the first state, and the second lever is configured to move the second pressing portion in conjunction with the movement of the carriage when the switching member is in the second state.

According to this configuration, when the switching member is in the first state, air bubbles from the first storage chamber can be sucked. When the switching member is in the second state, air bubbles can be sucked from the second storage chamber. That is, since the air bubbles can be individually sucked from each storage chamber depending on the state of the switching member, consumption of the liquid can be suppressed when the air bubbles are discharged.

B In the liquid ejection apparatus, the switching member may be a cam member, each of the first lever and the second lever may have a valve opening lever and a cam lever, and the cam lever may move a rotation center of the valve opening lever.

According to this configuration, each of the first lever and the second lever has the valve opening lever and the cam lever. Therefore, an operational load of the carriage can be reduced as compared with the case where the first pressing portion and the second pressing portion are moved only by the force of moving the carriage.

C In the liquid ejection apparatus, the second storage chamber may be a filter chamber in which a filter is disposed, and the first storage chamber may be a pressure chamber disposed downstream of the filter chamber.

According to this configuration, the air bubbles trapped in the filter accumulate in the second storage chamber. In the first storage chamber, air bubbles that appear after passing through the filter in a state of being dissolved in the liquid are accumulated. Therefore, in the first storage chamber and the second storage chamber, the bias of the amount of air bubbles is likely to be large. However, since the first storage chamber and the second storage chamber can be individually sucked depending on the state of the switching member, the air bubbles can be appropriately discharged.

D In the liquid ejection apparatus, the carriage may move to a predetermined position to couple the coupling portion and the coupled portion without moving the first pressing portion and the second pressing portion.

According to this configuration, when the carriage moves to the predetermined position, the coupling portion and the coupled portion are coupled to each other, but the first pressing portion and the second pressing portion are not moved. Therefore, it is possible to couple the coupling portion and the coupled portion and open and close the first discharge flow path and the second discharge flow path at different timings.

E In the liquid ejection apparatus, the coupling portion may include a suction pipe and a support portion that supports the suction pipe, the suction pipe may be rotatable in a first direction different from the scanning direction, and the support portion may be rotatable in a second direction different from the scanning direction and the first direction.

According to this configuration, the suction pipe supported by the support portion is rotatable in the first direction and the second direction. Therefore, even when the positions of the coupling portion and the coupled portion deviate due to aged deterioration or the like, for example, the coupling portion can be coupled to the coupled portion.

F A control method of a liquid ejection apparatus that includes a liquid ejection head ejecting a liquid from a nozzle, a liquid storage portion having a first storage chamber and a second storage chamber and configured to store the liquid supplied from a liquid supply source to the liquid ejection head, a first discharge flow path through which air bubbles are discharged from the first storage chamber, a second discharge flow path through which air bubbles are discharged from the second storage chamber, a carriage on which the liquid ejection head, the liquid storage portion, the first discharge flow path, and the second discharge flow path are mounted and which is configured to reciprocate in a scanning direction, a coupling portion configured to be coupled to and separated from a coupled portion coupled to the first discharge flow path and the second discharge flow path, a negative pressure generating section coupled to the coupling portion to apply a negative pressure to the first discharge flow path and the second discharge flow path, a first opening/closing portion configured to open and close the first discharge flow path, a second opening/closing portion configured to open and close the second discharge flow path, a first pressing portion configured to move to open and close the first opening/closing portion, a second pressing portion configured to move to open and close the second opening/closing portion, a first lever rotating in conjunction with a movement of the carriage, a second lever rotating in conjunction with the movement of the carriage, and a switching member configured to switch between a first state and a second state and displace positions of the first lever and the second lever, the control method including: moving the first pressing portion by the first lever in conjunction with the movement of the carriage to discharge air bubbles from the first storage chamber when the switching member is in the first state; and moving the second pressing portion by the second lever in conjunction with the movement of the carriage to discharge air bubbles from the second storage chamber when the switching member is in the second state. According to this method, the same effect as that of the liquid ejection apparatus can be achieved.

G The control method of a liquid ejection apparatus may further include coupling the coupling portion and the coupled portion without moving the first pressing portion and the second pressing portion by moving the carriage to a predetermined position and applying a negative pressure to the coupled portion after positioning the carriage at the predetermined position and before opening the first discharge flow path and the second discharge flow path. According to this method, after coupling the coupling portion and the coupled portion and before opening the first discharge flow path and the second discharge flow path, a negative pressure is applied to the coupled portion. Therefore, by applying a negative pressure to the coupled portion first, it is possible to reduce the possibility that a backflow occurs when the first discharge flow path and the second discharge flow path are opened.

H The control method of a liquid ejection apparatus may further include stopping an action of the negative pressure to the coupled portion after discharging air bubbles from the first storage chamber and the second storage chamber and positioning the carriage at the predetermined position to close the first discharge flow path and the second discharge flow path.

According to this method, the action of the negative pressure on the coupled portion is stopped after the first discharge flow path and the second discharge flow path are closed. Therefore, it is possible to reduce the possibility that a backflow occurs in the first discharge flow path and the second discharge flow path.

What is claimed is:

1. A liquid ejection apparatus comprising:
- a liquid ejection head ejecting a liquid from a nozzle;
- a liquid storage portion having a first storage chamber and a second storage chamber, the liquid storage portion being configured to store the liquid supplied from a liquid supply source to the liquid ejection head;
- a first discharge flow path communicating with an upper portion of the first storage chamber;
- a second discharge flow path communicating with an upper portion of the second storage chamber;
- a carriage on which the liquid ejection head, the liquid storage portion, the first discharge flow path, and the second discharge flow path are mounted, the carriage being configured to reciprocate in a scanning direction;
- a coupling portion configured to be coupled to and separated from a coupled portion, the coupled portion communicating with the first discharge flow path and the second discharge flow path;

a negative pressure generating section applying a negative pressure to the first discharge flow path and the second discharge flow path via the coupling portion;

a first opening/closing portion configured to open and close the first discharge flow path;

a second opening/closing portion configured to open and close the second discharge flow path; and a switching member configured to switch between a first state and a second state, wherein the first opening/closing portion is configured to be opened and closed in conjunction with a movement of the carriage when the switching member is in the first state, and the second opening/closing portion is configured to be opened and closed in conjunction with the movement of the carriage when the switching member is in the second state.

2. The liquid ejection apparatus according to claim 1, further comprising:

a first pressing portion configured to move to open and close the first opening/closing portion;

a second pressing portion configured to move to open and close the second opening/closing portion;

a first lever rotating in conjunction with the movement of the carriage; and a second lever rotating in conjunction with the movement of the carriage, wherein the switching member is configured to displace positions of the first lever and the second lever, the first lever is configured to move the first pressing portion in conjunction with the movement of the carriage when the switching member is in the first state, and the second lever is configured to move the second pressing portion in conjunction with the movement of the carriage when the switching member is in the second state.

3. The liquid ejection apparatus according to claim 2, wherein the switching member is a cam member, each of the first lever and the second lever has a valve opening lever and a cam lever, and the cam lever moves a rotation center of the valve opening lever.

4. The liquid ejection apparatus according to claim 1, wherein the second storage chamber is a filter chamber in which a filter is disposed, and the first storage chamber is a pressure chamber disposed downstream of the filter chamber.

5. The liquid ejection apparatus according to claim 2, wherein the carriage moves to a predetermined position to couple the coupling portion and the coupled portion without moving the first pressing portion and the second pressing portion.

6. The liquid ejection apparatus according to claim 5, wherein the coupling portion includes a suction pipe and a support portion that supports the suction pipe, the suction pipe is rotatable in a first direction different from the scanning direction, and the support portion is rotatable in a second direction different from the scanning direction and the first direction.

7. A control method of a liquid ejection apparatus that includes a liquid ejection head ejecting a liquid from a nozzle, a liquid storage portion having a first storage chamber and a second storage chamber, the liquid storage portion being configured to store the liquid supplied from a liquid supply source to the liquid ejection head, a first discharge flow path communicating with an upper portion of the first storage chamber, a second discharge flow path communicating with the upper portion of the second storage chamber, a carriage on which the liquid ejection head, the liquid storage portion, the first discharge flow path, and the second discharge flow path are mounted, the carriage being configured to reciprocate in a scanning direction, a coupling portion configured to be coupled to and separated from a coupled portion, the coupled portion communicating with the first discharge flow path and the second discharge flow path, a negative pressure generating section applying a negative pressure to the first discharge flow path and the second discharge flow path via the coupling portion, a first opening/closing portion configured to open and close the first discharge flow path, a second opening/closing portion configured to open and close the second discharge flow path, and a switching member configured to switch between a first state and a second state, the control method comprising:

opening the first opening/closing portion by setting the switching member to the first state and moving the carriage, and discharging air bubbles from the first storage chamber; and opening the second opening/closing portion by setting the switching member to the second state and moving the carriage, and discharging air bubbles from the second storage chamber.

8. The control method of a liquid ejection apparatus according to claim 7 that further includes a first pressing portion configured to move to open and close the first opening/closing portion, a second pressing portion configured to move to open and close the second opening/closing portion, a first lever rotating in conjunction with a movement of the carriage, and a second lever rotating in conjunction with the movement of the carriage, in which the switching member is configured to displace positions of the first lever and the second lever, the control method further comprising:

moving the first pressing portion by the first lever by setting the switching member to the first state and moving the carriage, and discharging air bubbles from the first storage chamber; and moving the second pressing portion by the second lever by setting the switching member to the second state and moving the carriage, and discharging the air bubbles from the second storage chamber.

9. The control method of a liquid ejection apparatus according to claim 8, further comprising:

coupling the coupling portion and the coupled portion without moving the first pressing portion and the second pressing portion by moving the carriage to a predetermined position; and applying a negative pressure to the coupled portion after positioning the carriage at the predetermined position and before opening the first discharge flow path and the second discharge flow path.

10. The control method of a liquid ejection apparatus according to claim 9, further comprising:

stopping an action of the negative pressure to the coupled portion after discharging air bubbles from the first storage chamber and the second storage chamber and positioning the carriage at the predetermined position to close the first discharge flow path and the second discharge flow path.

* * * * *